United States Patent
Yang et al.

(10) Patent No.: US 12,143,219 B2
(45) Date of Patent: Nov. 12, 2024

(54) DATA RETRANSMISSION METHOD AND DEVICE, STORAGE MEDIUM, AND ELECTRONIC DEVICE

(71) Applicant: ZTE CORPORATION, Shenzhen (CN)

(72) Inventors: Dan Yang, Shenzhen (KR); Ning Wei, Shenzhen (KR); Nan Li, Shenzhen (KR); Bo Sun, Shenzhen (KR); Kaiying Lv, Shenzhen (KR)

(73) Assignee: ZTE CORPORATION, Shenzhen (CN)

( * ) Notice: Subject to any disclaimer, the term of this patent is extended or adjusted under 35 U.S.C. 154(b) by 450 days.

(21) Appl. No.: 17/421,948

(22) PCT Filed: Jan. 7, 2020

(86) PCT No.: PCT/CN2020/070735
§ 371 (c)(1),
(2) Date: Jul. 9, 2021

(87) PCT Pub. No.: WO2020/143635
PCT Pub. Date: Jul. 16, 2020

(65) Prior Publication Data
US 2022/0116149 A1 Apr. 14, 2022

(30) Foreign Application Priority Data
Jan. 9, 2019 (CN) .......................... 201910020987.6

(51) Int. Cl.
*H04L 1/18* (2023.01)
*H04L 1/1607* (2023.01)
*H04L 1/1812* (2023.01)

(52) U.S. Cl.
CPC .......... *H04L 1/1812* (2013.01); *H04L 1/1614* (2013.01); *H04L 1/1657* (2013.01)

(58) Field of Classification Search
CPC ... H04L 1/1812; H04L 1/1614; H04L 1/1657; H04L 1/0008; H04L 1/1628;
(Continued)

(56) References Cited

U.S. PATENT DOCUMENTS 9,480,018 B2 * 10/2016 Liu .................. H04W 52/0219
10,742,285 B1 * 8/2020 Chu .................... H04B 7/0695
(Continued)

FOREIGN PATENT DOCUMENTS

CN         101621368 A       1/2010
CN         101932008 A       12/2010
(Continued)

OTHER PUBLICATIONS

Tian et al. U.S. Appl. No. 62/717,218, filed Aug. 10, 2018 (Year: 2018).*
(Continued)

*Primary Examiner* — Wutchung Chu
(74) *Attorney, Agent, or Firm* — CANTOR COLBURN LLP

(57) ABSTRACT

Provided are a data retransmission method and device, a storage medium, and an electronic device. The method includes: transmitting a first data packet, wherein the first data packet comprises data block identification information.

18 Claims, 2 Drawing Sheets

(58) Field of Classification Search
CPC ... H04L 1/1819; H04L 1/1835; H04L 1/1845; H04L 1/188; H04L 1/1896; H04L 1/1822; H04L 1/0083

See application file for complete search history.

(56) References Cited

U.S. PATENT DOCUMENTS

| | | | |
|---|---|---|---|
| 11,228,944 B2* | 1/2022 | Sakai | H04L 1/0091 |
| 2002/0172208 A1 | 11/2002 | Malkamaki | |
| 2008/0307284 A1 | 12/2008 | Aghili et al. | |
| 2012/0140753 A1* | 6/2012 | Lee | H04B 7/0452 370/338 |
| 2012/0327838 A1* | 12/2012 | Seok | H04W 4/06 370/312 |
| 2013/0223345 A1* | 8/2013 | Asterjadhi | H04W 28/06 370/328 |
| 2014/0328430 A1* | 11/2014 | Park | H04L 1/0075 375/295 |
| 2016/0366254 A1* | 12/2016 | Asterjadhi | H04L 5/0091 |
| 2018/0337753 A1* | 11/2018 | Yao | H04L 1/1607 |
| 2019/0254099 A1* | 8/2019 | Chu | H04L 1/1614 |
| 2020/0052832 A1* | 2/2020 | Tian | H04L 1/1614 |
| 2020/0153547 A1* | 5/2020 | Latif | H04L 1/1893 |
| 2021/0227502 A1* | 7/2021 | Huang | H04L 1/1614 |

FOREIGN PATENT DOCUMENTS

| | | |
|---|---|---|
| CN | 103368703 A | 10/2013 |
| CN | 104518853 A | 4/2015 |
| CN | 108631948 A | 10/2018 |
| CN | 108631951 A | 10/2018 |
| WO | 2010151550 A1 | 12/2010 |
| WO | 2012024870 A1 | 3/2012 |
| WO | 2017201360 A1 | 11/2017 |

OTHER PUBLICATIONS

Latif et al. U.S. Appl. No. 62/758,677, filed Nov. 11, 2018 (Year: 2018).*
International Search Report issued Apr. 15, 2020 re: Application No. PCT/CN2020/070735, pp. 1-2, citing: CN 103368703 A, CN 101932008 A, CN 104518853 A, CN 101621368 A, CN 108631948 A, CN 108631951 A and WO 2021024870 A1.
Written Opinion issued Apr. 15, 2020 re: Application No. PCT/CN2020/070735, pp. 1-3, citing: CN 103368703 A.
European Search Report for corresponding application EP20738588; Report dated Feb. 16, 2022.

* cited by examiner

Fig.1
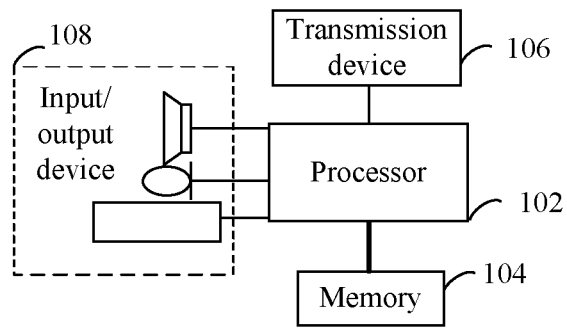
Fig.2
Transmitting a first data packet, wherein the first data packet includes data block identification information — S202
Fig.3
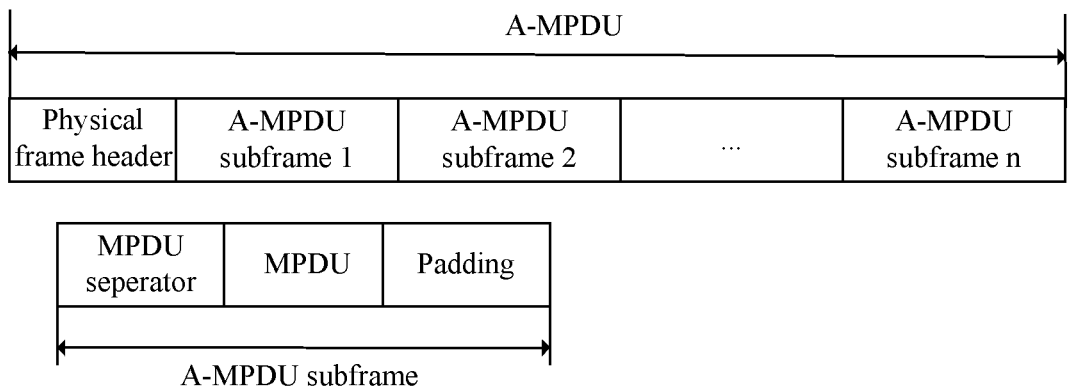
Fig. 4
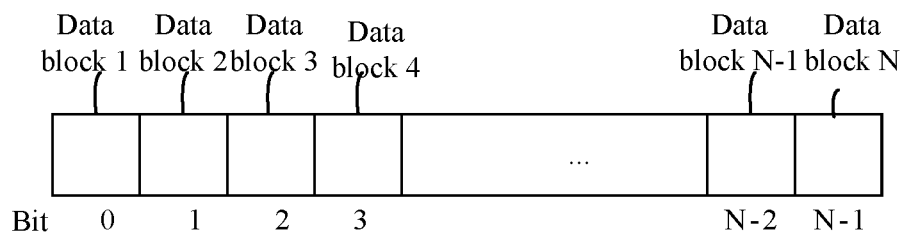
Fig.5
Receiving a first data packet, wherein the first data packet includes data block identification information — S602

DATA RETRANSMISSION METHOD AND DEVICE, STORAGE MEDIUM, AND ELECTRONIC DEVICE

This application is a National Stage Filing of the PCT International Application No. PCT/CN2020/070735 filed on 7 Jan. 2021, which claims priority to Chinese Patent Application No. 201910020987.6, filed with the China National Intellectual Property Administration on 9 Jan. 2019, the disclosure of which is incorporated herein by reference in its entirety.

TECHNICAL FIELD

The present disclosure relates to the field of communications, and in particular, to a data retransmission method and device, a storage medium, and an electronic device.

BACKGROUND

With the development of wireless local area network technologies, Wireless Fidelity (WiFi) performance is continuously improved, a requirement for transmission reliability is also continuously increased, and edge users are supported.

In a wireless local area network, common devices include an Access Point (AP) and a non-AP Station (STA). An AP establishes a Basic Service Set (BSS), and an STA is associated with the AP through a scanning authentication association process, and communicates with the AP, or communicates with other STAs through the AP. In another wireless local area network, for example, an Independent BSS (IBSS), there is no access point similar to AP, and all stations can communicate with each other directly.

At present, in a wireless local area network, a sender transmits data in an Aggregation Medium Access Control (MAC) Protocol Data Unit (A-MPDU). The A-MPDU is composed of a plurality of A-MPDU subframes, each A-MPDU subframe includes one MAC Protocol Data Unit (MPDU), and each MPDU is identified by a Sequence Number. By receiving an acknowledgement frame from the sender, a receiver can know which subframes in the A-MPDU are correctly received and which subframes are not correctly received.

In a current wireless local area network, a receiver discards a frame which is incorrectly received. Since the discarded frame still includes useful information, if the frame is discarded, the useful information is lost.

When an A-MPDU is received, there is a case where some A-MPDU subframes are received correctly and the other A-MPDU subframes are received incorrectly. Since a receiver does not correctly decode these subframes which are received incorrectly, a corresponding Sequence Number of the MPDU cannot be obtained. Therefore, the station cannot perform joint decoding on MPDUs, which have the same Sequence Number, received in multiple transmissions.

In order to implement a hybrid automatic repeat mechanism, the present disclosure provides a method for implementing a hybrid automatic repeat mechanism.

Aiming at the described technical problem, no effective solution has been proposed in the related art.

SUMMARY

Embodiments of the present disclosure provide a data retransmission method and device, a storage medium, and an electronic device, which may at least solve a problem in the related art that resources are wasted due to data subframe retransmission.

According to some embodiments of the present disclosure, provided is a data retransmission method, including: transmitting a first data packet, wherein the first data packet includes data block identification information.

According to some other embodiments of the present disclosure, provided is a data retransmission method, including: receiving a first data packet, wherein the first data packet includes data block identification information.

According to some other embodiments of the present disclosure, provided is a data retransmission device, including: a first transmitting module, configured to transmit a first data packet, wherein the first data packet includes data block identification information.

According to another embodiment of the present disclosure, provided is a data retransmission device, including: a receiving module, configured to receive a first data packet, wherein the first data packet includes data block identification information.

According to some other embodiments of the present disclosure, provided is a storage medium storing a computer program, wherein the computer program is configured to execute the operations in any one of the described method embodiments at runtime.

According to some other embodiments of the present disclosure, provided is an electronic device, including a memory and a processor, wherein the memory stores a computer program, and the processor is configured to run the computer program to execute the operations in any one of the described method embodiments.

By means of the embodiments of the present disclosure, a sender transmits a first data packet to a receiver, wherein the first data packet includes data block identification information, the data block identification information is used for indicating one or more data blocks carried in the first data packet, and each data block is composed of one or more data subframes; the sender determines the one or more data subframes which are not correctly received in the one or more data blocks based on the reception status transmitted by the receiver, and then retransmits the one or more data subframes which are not correctly received. In this way, only one or more data subframes that are not correctly received are retransmitted, and the correctly received data subframes will not be retransmitted. Therefore, the problem in the related art that resources are wasted due to retransmission of data subframes can be solved, and the effects of saving resources and improving the retransmission efficiency can be achieved.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings:

FIG. 1 is a hardware structural block diagram of a mobile terminal for implementing a data retransmission method according to some embodiments of the present disclosure;

FIG. 2 is a flowchart (I) of a data retransmission method according to some embodiments of the present disclosure;

FIG. 3 is a schematic structural diagram of an A-MPDU according to some embodiments of the present disclosure;

FIG. 4 is a schematic diagram when data block identification information is a data block indication bitmap according to some embodiments of the present disclosure;

FIG. 5 is a flowchart (II) of a data retransmission method according to some embodiments of the present disclosure;

DETAILED DESCRIPTION

Figure 6:
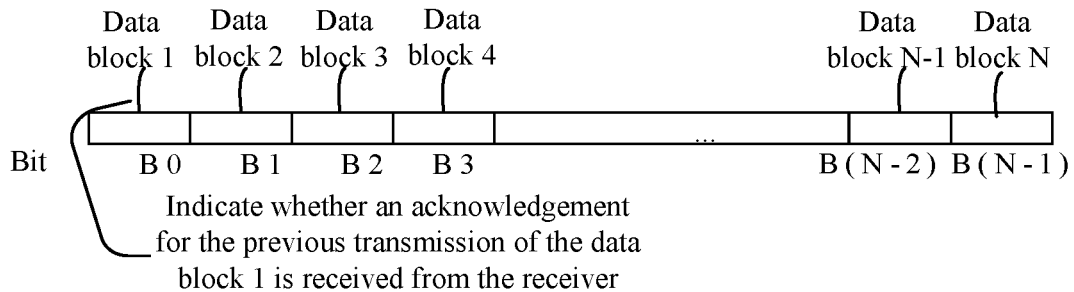
FIG. 6 is a diagram of an acknowledgement indication bitmap according to some embodiments of the present disclosure.

The present disclosure is described below in detail with reference to the drawings and in conjunction with the embodiments. It is to be noted that embodiments in the present application and characteristics in the embodiments may be combined to derive other embodiments not explicitly described.

It is to be noted that the terms "first", "second" and the like in the specification, the claims and the drawings of the present disclosure are used to distinguish similar objects, and are not used to describe a specific sequence or a precedence order.

The method embodiments provided in the embodiments of the present disclosure may be executed in a mobile terminal, a computer terminal, or a similar computing device. Taking running on a mobile terminal as an example, FIG. 1 is a hardware structural block diagram of a mobile terminal for implementing a data retransmission method according to some embodiments of the present disclosure. As shown in FIG. 1, the mobile terminal 10 may include one or more (only one is shown in FIG. 1) processors 102 (the processors 102 may include, but is not limited to, a processing device such as a microprocessor (MCU) or a programmable logic device (FPGA)) and a memory 104 for storing data. In some exemplary implementations, the mobile terminal may further include a transmission device 106 and an input/output device 108 for a communication function. A person having ordinary skill in the art may understand that the structure shown in FIG. 1 is merely exemplary, and does not limit the structure of the foregoing mobile terminal. For example, the mobile terminal 10 may also include more or fewer components than shown in FIG. 1, or have a different configuration than that shown in FIG. 1.

The memory 104 may be configured to store a computer program, for example, a software program and a module of an application software, such as a computer program corresponding to the data retransmission method in the embodiments of the present disclosure. The processor 102 runs the computer program stored in the memory 104, so as to execute various function applications and data processing, that is, implement the foregoing data retransmission method. Memory 104 may include high-speed random access memory, and may also include non-volatile memory, such as one or more magnetic storage devices, flash memory, or other non-volatile solid-state memory. In some instances, the memory 104 may further include memory remotely located from the processor 102, which may be connected to the mobile terminal 10 over a network. Examples of such networks include, but are not limited to, Internet, intranets, local area networks, mobile communication networks, and combinations thereof.

The transmitting device 106 is configured to receive or transmit data via a network. Specific examples of the described network may include a wireless network provided by a communication provider of the mobile terminal 10. In one example, the transmitting device 106 may include a Network Interface Controller (NIC) that may be coupled to other network devices via a base station to communicate with the Internet. In one example, the transmitting device 106 may be a Radio Frequency (RF) module for communicating wirelessly with the Internet.

A data retransmission method is provided in the embodiments of the present disclosure. FIG. 2 is a flowchart (I) of a data retransmission method according to some embodiments of the present disclosure. As shown in FIG. 2, the flow includes the following operation.

At operation S202, a first data packet is transmitted, wherein the first data packet includes data block identification information.

By means of the described operations, a sender transmits a first data packet to a receiver, wherein the first data packet includes data block identification information, the data block identification information is used for indicating one or more data blocks carried in the first data packet, and each data block is composed of one or more data subframes; the sender determines one or more data subframes which are not correctly received in the one or more data blocks based on the reception status transmitted by the receiver, and then retransmits the one or more data subframes which are not correctly received. In this way, only one or more data subframes that are not correctly received are retransmitted, and the correctly received data subframes will not be retransmitted. Therefore, the problem in the related art that resources are wasted due to retransmission of data subframes can be solved, and the effects of saving resources and improving the retransmission efficiency can be achieved.

In some exemplary implementations, an executing device of the foregoing operations may be a first station, but is not limited thereto. In the embodiments, the first station may be a sender that transmits a data packet, and the receiver may be a second station that receives the data packet.

It should be noted that the data subframe may be a codeword corresponding to a block code or an A-MPDU subframe.

It should be noted that, the first data packet in the embodiments is an A-MPDU in some exemplary implementations, wherein the A-MPDU is formed by a plurality of A-MPDU subframes (subframes), and each A-MPDU subframe is identified by a Sequence Number (SN). Alternatively, the A-MPDU is composed of a plurality of codewords, and each codeword is identified by a Codeword ID (CID).

In an exemplary embodiment, the A-MPDU further carries data block identification information. The sender and the receiver may be two STAs, and the STA may be an AP STA or a non-AP STA.

It should be noted that, in the related art, in a wireless local area network, a sender transmits data in an Aggregate Medium Access Control (MAC) Protocol Data Unit (A-MPDU). The A-MPDU includes a plurality of A-MPDU subframes) or is composed of codewords corresponding to a plurality of block codes. An A-MPDU in the related art does not carry the data block identification information.

In addition, when the data block identification information is a data block indication bitmap, each bit in the data block indication bitmap corresponds to one data block number for identifying a data block. The value of the bit is used to indicate whether the first data packet carries a data block corresponding to the data block number. For example, each bit of the data block indication bitmap carried in the A-MPDU corresponds to a data block number and is used for indicating whether the first data packet carries a data block corresponding to the data block number. One data block is composed of one or more data subframes (as shown in FIG. 3). For example, the data block indication bitmap includes N bits, in which bits 0 to (N−1) correspond to data block numbers 1 to N, respectively, as shown in FIG. 4. When the bit i is set to 1, it indicates that the current A-MPDU includes a data block with a data block number (i+1).

In an exemplary embodiment, the data block number may be at least one of a Hybrid Automatic Repeat Request (HARQ) process number, a transmission identifier, an A-MPDU identifier, and a packet number, but is not limited thereto.

When the data block number is an HARQ process number, each bit in the data block indication bitmap corresponds to an HARQ process number, and the value of the bit is used for indicating whether the first data packet carries a data block corresponding to the HARQ process number.

In an exemplary embodiment, the data block corresponding to the HARQ process number includes all the A-MPDU subframes previously transmitted by the HARQ process or only the A-MPDU subframes not correctly received.

In an exemplary embodiment, a reception status of the first data packet is determined in the following manner. The sender receives a first acknowledgement frame corresponding to the first data packet from the receiver, wherein the first acknowledgement frame is used for indicating whether the receiver receives a first data subframe. The sender determines, based on the first acknowledgement frame, one or more data subframes which are not correctly received in the first data packet, so as to determine one or more data subframes to be retransmitted.

In an exemplary embodiment, the one or more data subframes that are not correctly received may be determined based on SNs or CIDs carried in the first acknowledgement frame. If the value of the bit in the first acknowledgement frame is 1, it may be determined that the data subframe corresponding to the bit is correctly received, and a data subframe corresponding to the bit with a value set to 0 is a data subframe that is not correctly received, so that one or more data subframes to be retransmitted can be determined. Alternatively, the sender may determine, based on SN(s) or CID(s) of correctly received data subframe(s) carried in the first acknowledgement frame, which data subframes are not correctly received, so as to determine the one or more data subframes to be retransmitted. During retransmission, only one or more data subframes needing to be retransmitted are retransmitted, thereby saving retransmission resources.

In an exemplary embodiment, if the sender does not receive, within a predetermined time interval, the first acknowledgement frame corresponding to the first data packet and transmitted by the receiver, it may be determined that the first data packet is not correctly received. The data subframes which are not correctly received in the first data packet may be determined as the data subframes to be retransmitted. The predetermined time interval may be set based on a property of the data packet, for example, 5 s or 10 s.

In an exemplary embodiment, the cases where the sender does not receive the first acknowledgement frame corresponding to the first data packet and transmitted by the receiver may include two cases, one is that the receiver does not receive the first data packet and does not transmit the first acknowledgement frame naturally; and the second one is that although the receiver transmits the first acknowledgement frame, the first acknowledgement frame is lost in the transmission process.

It should be noted that the first data packet may be a data packet transmitted for the first time (initial transmission data packet), that is, the first data packet does not include retransmitted data subframes. For example, when the A-MPDU is an initial transmission frame transmitted by STA1 to STA2, STA1 sets the value of only one bit in the data block indication bitmap carried in the A-MPDU to 1, and sets the values of all the other bits to 0.

In an exemplary embodiment, after the one or more data subframes to be retransmitted are determined, the one or more data subframes to be retransmitted are retransmitted in the following manner. The one or more data subframes to be retransmitted are configured (arranged) in a first data block according to an order of SN(s) or CID(s), wherein the first data block only includes the one or more data subframes to be retransmitted. The first data block is set in a second data packet, and the value of the bit corresponding to the first data block in the data block indication bitmap carried in the second data packet is set to a first preset value, which may be 1 for indicating that the second data packet includes the first data block. The second data packet is transmitted.

It should be noted that, the second data packet is a data packet which is transmitted not for the first time, since one or more data subframes to be retransmitted are carried therein. Of course, the second data packet may also include other data blocks or/and new data subframes, that is, the second data packet may further include a third data block, wherein the third data block includes second data subframes arranged in a preset order (for example, the second data subframes may be arranged in an ascending order or a descending order of SN(s) or CID(s)), and the value of the bit corresponding to the third data block in the data block indication bitmap of the second data packet is set to a first preset value. The first data block and the third data block are arranged according to a preset order, for example, according to an order of positions of bits to which the first data block and the third data block respectively correspond in the data block indication bitmap.

For example, when the A-MPDU is not an initial transmission frame transmitted by STA1 to STA2, the A-MPDU may include newly transmitted data block(s) or retransmitted data block(s), or include both the newly transmitted data block(s) and the retransmitted data block(s). One or more of the following operations may be performed.

When the A-MPDU simultaneously includes the newly transmitted data block(s) and the retransmitted data block(s), the newly transmitted data block(s) and the retransmitted data block(s) are arranged according to a preset order.

When the A-MPDU includes a plurality of retransmitted data blocks, the retransmitted data blocks are sequentially arranged according to the order of respective bit positions to which the retransmitted data blocks correspond in the data block indication bitmap;

The data subframes in the retransmitted data block(s) in the A-MPDU are arranged in a certain order, for example, in an ascending order of SNs.

STA1 groups, according to a received acknowledgement indication, one or more data subframes which are not correctly received in the current transmission into the same data block.

It should be noted that all the data blocks carried in the second data packet may also be newly transmitted data blocks, that is, the second data packet does not carry data blocks carrying data subframes to be retransmitted.

In an exemplary embodiment, in a case where the first data packet includes a plurality of data blocks, the plurality of data blocks are arranged according to positions (i.e., high and low bits) of bits, to which data block numbers of the data blocks correspond, in the data block indication bitmap.

In an exemplary embodiment, the second data packet further includes at least one of: data block reception status information, wherein the data block reception status information is used for indicating that the second data packet includes all data subframes in the one or more data blocks of the first data packet, or includes data subframes not correctly received in the one or more data blocks of the first data packet.

It should be noted that the data block reception status information may be an acknowledgement bitmap, for example, when STA2 receives the first data subframe, STA2 transmits a first acknowledgement frame to STA1, and when STA1 transmits a second data packet to STA2, the value of the bit in the acknowledgement indication bitmap carried in the second data packet is set to a special value for indicating that the first acknowledgement frame is received, and values of other bits are set to arbitrary values. The value of the bit in the acknowledgement indication bitmap is further used for indicating that the second data packet includes all data subframes in the one or more data blocks of the first data packet, or includes data subframes that are not correctly received in the one or more data blocks of the first data packet.

It should be noted that, the data block reception status information may also be full data subframe or partial data subframe indication information, wherein the full data subframe or partial data subframe indication information is used for indicating that the second data packet includes all data subframes in the one or more data blocks of the first data packet, or includes data subframes that are not correctly received in the one or more data blocks of the first data packet.

The embodiments provide a data retransmission method. FIG. 5 is a flowchart (II) of a data retransmission method according to some embodiments of the present disclosure. As shown in FIG. 5, the flow includes the following operation.

At operation S502, a first data packet is received, wherein the first data packet carries data block identification information.

By means of the described operations, a receiver receives a first data packet transmitted by a sender, wherein the first data packet includes data block identification information, the data block identification information is used for indicating one or more data blocks carried in the first data packet, and each data block is composed of one or more data subframes; and the receiver transmits a reception status of the first data subframe after receiving the first data packet. The sender can determine one or more data subframes which are not correctly received based on the reception status, so that only the one or more data subframes which are not correctly received are retransmitted, and one or more data subframes which are correctly received do not need to be retransmitted. Therefore, the problem in the related art that resources are wasted due to retransmission of data subframes can be solved, and the effects of saving resources and improving the retransmission efficiency can be achieved.

In some exemplary implementations, an executing device of the foregoing operations may be a second station, but is not limited thereto. In the embodiments, the second station may be a receiver; and the sender may be a first station configured to transmit the data subframes.

It should be noted that, the first data packet in the embodiments is an A-MPDU in some exemplary implementations, wherein the A-MPDU includes a plurality of A-MPDU subframes (namely, first data subframes), and each A-MPDU is identified by an SN. Alternatively, the A-MPDU includes a plurality of codewords, and each codeword is identified by a CID.

In an exemplary embodiment, the A-MPDU further carries data block identification information. The sender and the receiver may be two STAs.

It should be noted that, in the related art, in a wireless local area network, a sender transmits data in an Aggregate Medium Access Control (MAC) Protocol Data Unit (A-MPDU). The A-MPDU is composed of a plurality of A-MPDU subframes, and each A-MPDU subframe includes a MAC Protocol Data Unit (or MPDU). An A-MPDU in the related art does not carry data block identification information.

In addition, when the data block identification information is a data block indication bitmap, each bit in the data block indication bitmap corresponds to a data block number for identifying the data block, and the value of the bit is used for indicating whether the first data packet carries a data block corresponding to a data block number. For example, each bit of a data block indication bitmap carried in an A-MPDU corresponds to a data block number for indicating whether a data block corresponding to the data block number is carried. One data block is composed of one or more data subframes (subframes). For example, the data block indication bitmap includes N bits, wherein bits 0 to (N−1) correspond to a data block number 1 to a data block number N, as shown in FIG. 4. When the bit i is set to 1, it indicates that a current A-MPDU includes a data block with a data block number (i+1).

In an exemplary embodiment, after receiving the first data packet, the receiver determines, based on the data block identification information, a data block carried in the first data packet. In a case where a first data packet includes a plurality of data blocks, the plurality of data blocks are respectively stored and the lengths of the plurality of data blocks are recorded respectively.

In an exemplary embodiment, after receiving the first data packet, a first acknowledgement frame needs to be transmitted. After receiving the first acknowledgement frame, the sender may determine one or more data subframes to be retransmitted based on an SN or a CID or a bit value in the first acknowledgement frame. For example, when the first data packet A-MPDU1 is an initial transmission frame transmitted by a sender STA1 to a receiver STA2, STA1 sets only the bit 0 in the data block indication bitmap carried in A-MPDU1 to 1, and sets all the other bits to 0. When STA2 receives the A-MPDU1, according to the indication in the data block indication bitmap carried in the A-MPDU1, the A-MPDU1 is judged to only include a data block 1, STA2 can obtain an SN or CID of each correctly received data subframe by decoding, and set the bits corresponding to these SNs or CIDs in the first acknowledgement frame to 1, so as to indicate that the data subframes corresponding to the SNs or CIDs are correctly received. The first acknowledgement frame is transmitted to STA1. In this way, STA1 groups the data subframes that are not correctly received in the data block into one data block, and the data subframes in the data block are arranged in a preset order. For example, all subframes, except for subframes with SN=2, 4 and 5, of the data block 1 carried in the first data packet A-MPDU1 which are not correctly received may be grouped into a data block 1, the data block 1 is cached, and a first acknowledgement frame is replied to STA1, wherein the first acknowledgement frame indicates that the subframes with SN=2, 4 and 5 are correctly received.

It can be seen that the sender can learn which data subframes in a certain data block are correctly received through the received first acknowledgement frame, so as to learn one or more data subframes that are not correctly received, and the sender groups the one or more data subframes that are not correctly received in the data block into one data block, and retransmits the data block. For example, all subframes which are not correctly received in the A-MPDU1 may be grouped into one data block, and subframes with SN=1 and SN=3 which are not correctly received may be grouped into a data block 1, and the data block 1 is retransmitted.

In an exemplary embodiment, after transmitting the first acknowledgement frame to the sender, the receiver continues to receive the second data packet. Based on the value of each bit in the data block indication bitmap in the second data packet, the receiver determines one or more data blocks carried in the second data packet, wherein if the value of the bit corresponding to a first data block is a first preset value, the second data packet includes the first data block. The receives performs joint decoding on the first data block and the locally stored first data block. For example, STA2 receives an A-MPDU2 (the second data packet), and determines, according to the indication of the data block indication bitmap carried in the A-MPDU2, that the A-MPDU2 carries a data block 1. Since there is a data block 1 locally cached, STA2 performs joint decoding on the data block 1 in the A-MPDU2 and the locally cached data block 1.

It can be seen that after receiving the first data packet, the receiver stores the data blocks in the first data packet, and records the length of the data blocks in the first data packet. Based on the correctly received data subframes, the data subframes which are not correctly received are stored, i.e. the data subframes to be retransmitted are stored; the lengths of the data subframes to be retransmitted are recorded; and the data subframes to be retransmitted are recorded as a first data block. In this way, after the second data packet is received, the data blocks carried in the second data packet are obtained and then joint decoding can be performed. That is to say, the second data packet may include only the one or more data subframes to be retransmitted in the first data block, wherein the one or more data subframes to be retransmitted are data subframes that have not been correctly received in the previous transmission. The second data packet may also include a third data block, wherein the value of the bit corresponding to the third data block in the data block indication bitmap carried in the second data packet is set to a first preset value. If the second data packet includes the first data block, after receiving the first data block, the receiver performs joint decoding on the first data block and the first data block cached locally. For example, the SNs of the data subframes carried in the first data block of the first data packet are 1, 2, 3, 4 and 5, and when receiving the first data packet, the data subframes corresponding to 2, 4 and 5 in the first data block are correctly received, then the remaining data subframes that are not correctly received in the first data block may be grouped into a data block to be retransmitted, the data block number of the data block to be retransmitted is the same as the data block number of the first data block, and the content of the first data block may be updated and recorded as the data block to be retransmitted, the length of the data block is recorded as L1, and the first data block (data block to be retransmitted) is stored locally. After it is determined that the second data packet includes the first data block, the first data block carried in the second data packet is acquired according to the locally recorded length L1 of the first data block, and HARQ joint decoding is performed on the first data block acquired from the second data packet and the to-be-retransmitted data subframes of the first data block stored locally.

For example, when the A-MPDU is not an initial transmission frame transmitted by STA1 to STA2, the A-MPDU may include newly transmitted data block(s) or retransmitted data block(s), or include both the newly transmitted data block(s) and the retransmitted data block(s). One or more of the following operations are performed.

When the A-MPDU simultaneously includes the newly transmitted data block(s) and the retransmitted data block(s), the newly transmitted data block(s) and the retransmitted data block(s) are arranged according to a preset order;

When the A-MPDU includes a plurality of retransmitted data blocks, the retransmitted data blocks are sequentially arranged according to the order of the positions of the bits corresponding to the retransmission data blocks in the bitmap;

The data subframes in the retransmitted data block(s) in the A-MPDU are arranged in a certain order, for example, in an ascending order of SNs or CIDs.

STA1 groups, according to the reception status indication or acknowledgement indication, the one or more data subframes which are not correctly received in the current transmission into the same data block.

In an exemplary embodiment, the second data packet further includes at least one of: data block reception status information, wherein a value of the data block reception status information is used for indicating that the second data packet includes all data subframes of the one or more data blocks of the first data packet, or includes data subframes not correctly received in the one or more data blocks of the first data packet.

In an exemplary embodiment, the data block reception status information may be an acknowledgement bitmap, for example, when STA2 receives a first data packet, STA2 transmits a first acknowledgement frame to STA1, and when STA1 transmits a second data packet to STA2, STA1 sets a value of a corresponding bit in an acknowledgement indication bitmap carried in the second data packet to a second predetermined value for indicating that the first acknowledgement frame is received.

In an exemplary embodiment, after receiving the second data packet, the receiver transmits a second acknowledgement frame to the sender, wherein the second acknowledgement frame is used for indicating one or more data subframes correctly received in the second data packet.

In an exemplary embodiment, the data block reception status information may be a full data subframe indication or a partial data subframe indication for indicating that the second data packet includes all data subframes of the first data block in the first data packet, or only includes data subframes not correctly received in the first data block in the first data packet.

In some exemplary implementations, the full data subframe indication or the partial data subframe indication may be a full/partial A-MPDU subframe indication or an full/partial codeword indication.

The present disclosure will be described below in detail with reference to exemplary embodiments.

In a wireless network, there may be a plurality of stations STAs. In the embodiments, the sender is STA1, and the receiver is STA2. A first data packet is an A-MPDU, and first data subframes are a plurality of MPDUs.

STA1 transmits an A-MPDU to STA2, wherein the A-MPDU includes a plurality of A-MPDU subframes, each A-MPDU is identified by an SN, and each A-MPDU further carries a data block indication bitmap.

Each bit of the data block indication bitmap carried in an A-MPDU corresponds to a data block number, and the value of the bit is used for indicating whether a data block corresponding to the data block number is carried. One data block is composed of one or more A-MPDU subframes (in the embodiments of the present disclosure, an A-MPDU subframe is referred to as a subframe for short). For example, a data block indication bitmap includes N bits, in which bits 0 to (N−1) respectively correspond to a data block number 1 to a data block number N, and when bit i is set to the first predefined value (for example, 1), it indicates that a current A-MPDU includes a data block with a data block number (i+1).

The A-MPDU may carry one or more data blocks.

When an A-MPDU is an initial transmission frame transmitted by STA1 to STA2, STA1 sets only one bit in the data block indication bitmap carried in the A-MPDU to 1, and sets all the other bits to 0. For example, STA1 sets bit 0 to 1 and sets all the other bits to 0.

When the A-MPDU is not an initial transmission frame transmitted by STA1 to STA2, the A-MPDU may include newly transmitted data block(s) or retransmitted data block(s), or include both the newly transmitted data block(s) and the retransmitted data block(s). One or more of the following operations are performed:

when the A-MPDU simultaneously includes the newly transmitted data block(s) and the retransmitted data block(s), the newly transmitted data block(s) and the retransmitted data block(s) are arranged in order;

when the A-MPDU includes a plurality of retransmitted data blocks, the retransmitted data blocks are sequentially arranged according to the order of respective bit positions to which the retransmitted data blocks correspond in the data block indication bitmap; and the subframes in the retransmitted data block(s) in the A-MPDU are arranged in a certain order, for example, in an ascending order of SNs.

STA1 groups the subframes which are not correctly received in the current transmission into the same data block according to the received instruction in the BA.

When receiving the A-MPDU, based on the setting of bits in the data block indication bitmap carried in the A-MPDU, STA2 learns that the A-MPDU carries one or more data blocks and learns of the corresponding data block number of each data block.

(1) When only one bit in the data block indication bitmap is set to 1, that is, the A-MPDU carries only one data block, for example, bit i is set to 1, and the other bits are all set to 0, STA2 executes one or more of the following operations S1 to S3.

At S1, STA2 judges whether the data block with the data block number (i+1) is newly transmitted or retransmitted based on new transmission or retransmission indication information carried in the A-MPDU.

At S2, if no data block with data block number (i+1) is locally cached before the A-MPDU is received, subframes which are not correctly received in the A-MPDU are grouped into the same data block, and the data block is cached. The data block number of this data block is recorded as (i+1), and the subframes in the data block are arranged according to a certain order, for example, arranged according to an ascending order of the SNs.

At S3, before receiving the A-MPDU, if a data block with a data block number (i+1) is cached locally, joint decoding is performed on the data block in the received A-MPDU and the cached data block with the data block number (i+1).

(2) When a plurality of bits in the data block indication bitmap are simultaneously set to the first predefined value, STA2 sequentially obtains each data block carried in the A-MPDU according to the order of the bits set to the first predefined value in the data block indication bitmap. For example, if bit i, bit j, bit k, and bit m in the data block indication bitmap are set to the first predefined value (for example, 1) (i<j<k<m), and all the other bits in the data block indication bitmap are set to other values (for example, 0), then STA2 performs one or more of the following operations S1 to S3.

At S1, STA2 regards the part of data, the length of which is Li, in the beginning of all A-MPDU subframes in the A-MPDU as a data block (i+1), and performs joint decoding on this data block and a locally cached data block (i+1), wherein Li is the length of the data block (i+1) received previously and recorded locally.

At S2, STA2 regards the part of data, the length of which is Lj, immediately following the data block (i+1) as a data block (j+1), and performs joint decoding on this data block and a locally cached data block (j+1), wherein Lj is the length of the data block (j+1) received previously and recorded locally.

At S3, STA2 regards the part of data, the length of which is Lk, immediately following the data block (j+1) as a data block (k+1), and performs joint decoding on this data block and a locally cached data block (k+1), wherein Lk is the length of the data block (k+1) received previously and recorded locally.

A bit m is the highest bit among all the bits set to 1. STA2 judges whether the data block with the data block number (m+1) carried in the A-MPDU is a newly transmitted data block according to whether a data block with the data block number (m+1) is cached locally before receiving the A-MPDU or according to a new transmission/retransmission indication in the A-MPDU.

If a data block with the data block number (m+1) is cached locally before the A-MPDU is received, joint decoding is performed on the subframes in the received A-MPDU and the cached subframes.

If a data block with the data block number (m+1) is not cached locally before the A-MPDU is received, all subframes except the data block (i+1), the data block (j+1) and the data block (k+1) in all subframes of the A-MPDU are grouped into the same data block. The data block number of this data block is recorded as (m+1), and the subframes in the data block are arranged according to a certain order, for example, arranged according to an ascending order of the SNs.

STA1 transmits an A-MPDU to STA2, wherein the A-MPDU carries a data block (i+1) (i.e., a data block with the data block number (i+1), short as data block (i+1) hereinafter), a data block (j+1), and a data block (k+1), where i<j<k. STA1 sets bits i, j, k of the data block indication bitmap in A-MPDU to 1 respectively, and sets all the other bits to 0.

STA1 transmits an A-MPDU1 to STA2, wherein Sequence Numbers (SNs) of subframes carried in the A-MPDU1 are 1, 2, 3, 4, and 5 in order. STA1 sets bit 0 in the data block indication bitmap carried in the A-MPDU1 to 1, and sets all the other bits to 0. In this case, STA1 may regard the five data blocks as one group. After receiving an acknowledgement frame from STA2, STA1 learns that the subframes with SN=2, 4 and 5 have been correctly received, then STA1 regards the subframes with SN=1 and SN=3 as a data block 1. In the subsequent retransmission, the subframes with SN=1 and SN=3 are arranged in an ascending order of SNs and grouped into a data block 1 for transmission.

When STA2 receives the A-MPDU1, if the data block 1 is not cached locally, since according to the indication of the data block indication bitmap carried in the A-MPDU1, there is only one bit position 1 and no other data block is currently carried, all subframes which are not correctly received in the A-MPDU1 are grouped into one data block, and the data block is recorded, that is, STA2 groups the remaining subframes other than the subframes with SN=2, 4 and 5 which have been correctly received into a data block 1 and caches the data block 1, and replies an acknowledgement frame to STA1.

STA1 retransmits the data block 1 to STA2. The data block 1 or a redundancy version of the data block 1 is carried in the A-MPDU2 and transmitted. STA1 sets the bit 0 in the data block indication bitmap carried in the A-MPDU2 to 1, and sets the other bits to 0. STA1 may retransmit the data block 1 or different redundancy versions of the data block 1 multiple times.

STA2 receives the A-MPDU2, and determines, according to the indication in the data block indication bitmap carried in the A-MPDU2, that the A-MPDU2 carries a data block 1. Since a data block 1 is locally cached, STA2 acquires the data block 1 in the A-MPDU2, and performs joint decoding on the received data block 1 and the locally cached data block 1.

STA1 transmits an A-MPDU1 to STA2, wherein the A-MPDU1 includes Sequence Numbers (SNs) of subframes which are 1, 2, 3, 4, and 5 in order. STA1 sets bit 0 of the data block indication bitmap carried in the A-MPDU1 to 1 and sets all the other bits to 0. In the present case, STA1 may regard the five subframes as one group.

When receiving the A-MPDU1, STA2 learns that the A-MPDU1 carries the data block 1 according to the indication in the data block indication bitmap carried in the A-MPDU1. When STA2 has not cached the data block 1 locally, if STA2 correctly decodes the subframes with SN=2, 4 and 5 in the A-MPDU1, then STA2 returns an acknowledgement frame to STA1, indicating that the subframes with SN=2, 4 and 5 are received correctly. STA2 groups all the subframes received incorrectly in A-MPDU1 into one data block and caches this data block, for example, STA2 groups the remaining subframes in the A-MPDU1 other than subframes with SN=2, 4 and 5 into a data block 1, and caches the data block 1. STA2 records the total length of the data block 1 as L1.

After receiving the acknowledgement frame from STA2, STA1 learns that the subframes with SN=2, 4 and 5 have been correctly received, then STA1 regards the subframes with SN=1 and SN=3 as a data block 1. In the subsequent retransmission, the subframes with SN=1 and SN=3 are grouped into the data block 1 for transmission.

After receiving the acknowledgement frame, STA1 transmits an A-MPDU2 to STA2, wherein SNs of subframes carried in the A-MPDU2 are 6, 7, 8, and 9 in order. STA1 sets bit 1 in the data block indication bitmap carried in A-MPDU2 to 1, and sets all the other bits to 0. When receiving the A-MPDU2, STA2 learns that the A-MPDU2 carries the data block 2 according to the data block indication bitmap carried in the A-MPDU2. When a data block 2 is not cached locally or when new transmission/retransmission indication carried in the A-MPDU2 indicates new transmission, and only one bit in the data block indication bitmap is set to 1, STA2 decodes the A-MPDU2 to find that the subframes with SN=6 and SN=7 are decoded correctly, then STA2 groups all the subframes received incorrectly in A-MPDU2 into one data block, that is, STA2 groups the remaining subframes other than the subframes with SN=6 and SN=7 into a data block 2, and caches the data block 2. STA2 records the total length L2 of the data block 2. STA2 replies to STA1 with an acknowledgement frame indicating that the subframes with SN=6 and SN=7 are correctly received.

STA1 receives the acknowledgement frame from STA2, and learns that the subframes with SN=6 and 7 have been correctly received, then STA1 regards the subframes with SN=8 and 9 as a data block 2. In the subsequent retransmission of the subframes with SN=8 and 9, STA1 groups the subframes with SN=8 and 9 into a data block 2 for transmission.

Afterwards, STA1 transmits an A-MPDU3 to STA2, wherein the A-MPDU3 includes a data block 1 or different redundancy versions of the data block 1, and a data block 2 or different versions of the data block 2. STA1 sets bit 0 and bit 1 in the data block indication bitmap carried in the A-MPDU3 to 1 respectively, and sets all the other bits to 0.

STA2 receives the A-MPDU3, and learns, according to the indication of the data block indication bitmap carried in the A-MPDU3, that the A-MPDU includes a data block 1 and a data block 2. Since the data block 1 and the data block 2 have been cached locally, STA2 regards the part of data, the length of which is L1, in the beginning of the subframes in the A-MPDU3 as the data block 1, and performs joint decoding on the data block 1 with the locally cached data block 1. STA2 regards the part of data, the length of which is L2, following the data block 1 as the data block 2, and performs HARQ joint decoding on the data block 2 and the locally cached data block 2. STA2 returns an acknowledgement frame to STA1 according to the result of the HARQ joint decoding.

STA1 transmits an A-MPDU1 to STA2, wherein the A-MPDU1 includes Sequence Numbers (SNs) of subframes which are 1, 2, 3, 4, and 5 in order. STA1 sets bit 0 in the data block indication bitmap carried in the A-MPDU1 to 1, and sets all the other bits to 0. In this case, STA1 may regard the five data blocks as one group. When receiving the A-MPDU1, STA2 learns that the A-MPDU1 carries the data block 1 according to the data block indication bitmap carried in the A-MPDU1. When the data block 1 is not cached locally, and only one bit in the data block indication bitmap is set to 1, then all subframes not correctly received in the A-MPDU1 are grouped into one data block, and the data block is recorded. Here, STA2 correctly receives the subframes with SN=2, 4 and 5 in the A-MPDU1, STA2 groups the remaining subframes other than the subframes with SN=2, 4 and 5 in the A-MPDU1 into a data block 1, caches the data block 1, and records the total length of the data block 1 as L1. STA2 returns an acknowledgement frame 1 to STA1, indicating that the subframes with SN=2, 4, and 5 are correctly received.

STA1 receives the acknowledgement frame 1 from STA2, and learns that the subframes with SN=2, 4 and 5 have been correctly received, then STA1 regards the subframes with SN=1 and SN=3 as a data block 1, and binds the subframes with SN=1 and SN=3 together as a data block 1 for the subsequent retransmission.

STA1 transmits an A-MPDU2 to STA2, wherein the A-MPDU2 includes SNs of subframes which are 6, 7, 8, and 9 in order. STA1 sets bit 1 in the data block indication bitmap carried in A-MPDU2 to 1, and sets all the other bits to 0. When receiving the A-MPDU2, STA2 learns that the A-MPDU2 carries the data block 2 according to the indication of the data block indication bitmap carried in the A-MPDU2. When the data block 2 is not locally cached or the new transmission/retransmission indication in the A-MPDU2 indicates new transmission, and only one bit in the data block indication bitmap is set to 1, then all subframes that are not correctly received in the A-MPDU2 are grouped into one data block. For example, STA2 here correctly receives the subframes with SN=6 and 7, then groups the remaining subframes other than the subframes of 6 and 7 in the A-MPDU2 into a data block 2, caches the data block 2, and records the total length L2 of the data block 2. STA2 replies to STA1 with an acknowledgement frame 2.

After receiving the acknowledgement frame 2 from STA2, STA1 learns that the subframes with SN=6 and 7 have been correctly received, then STA1 regards the subframes with SN=8 and 9 as a data block 2. In the subsequent retransmission of the subframes with SN=8 and 9, the subframes with SN=8 and 9 are grouped into the data block 2 for transmission.

STA1 transmits an A-MPDU3 to STA2, wherein the A-MPDU3 includes a data block 1, a data block 2 and a group of new transmissions, and the group of new transmissions includes subframes with SN=10, SN=11, and SN=12. STA1 sets the bit 0 (corresponding to the data block 1) and the bit 1 (corresponding to data block 2) in the data block indication bitmap carried in the A-MPDU3 to 1, and additionally sets the bit i in the data block indication bitmap to 1 to indicate that one data block (block) (i+1) is also carried, for example, bit 2 is set to 1, and other bits in the data block indication bitmap are set to 0.

STA2 receives the A-MPDU3, and learns that the A-MPDU3 carries the data block 1, the data block 2 and the data block 3 according to the indication of the data block indication bitmap carried in the A-MPDU3. Since STA2 has cached locally the data block 1 and the data block 2, but has not cached the data block 3 corresponding to the bit 2 in the data block indication bitmap, STA2 sequentially obtains each data block in the A-MPDU3 according to the order of bits whose value is set to 1 in the data block indication bitmap. For example, STA2 regards the part of data, the length of which is L1, in the subframes of the A-MPDU3 as the data block 1, and performs joint decoding on this data block 1 and the locally cached data block 1. STA2 regards the part of data, the length of which is L2, following the data block 1 as the data block 2, and performs joint decoding on this data block 2 with the locally cached data block 2. STA2 collectively groups subframes which are not correctly received in the remaining subframes except for the data block 1 and the data block 2 into a data block 3, caches the data block 3, and records the length of the data block 3. For example, if STA2 only correctly receives the subframe with SN=11 in the remaining subframes except for the data block 1 and the data block 2, STA2 collectively groups subframes which are not correctly received in the remaining subframes except for the data block 1 and the data block 2 into a data block 3, records the length of the data block 3, and replies to STA1 an acknowledgement frame in which the bit corresponding to SN=11 is set to 1.

After receiving the acknowledgement frame, STA1 learns that STA2 correctly receives only the subframe SN=11 in the subframes except the data block 1 and the data block 2, then in the subsequent retransmission, STA1 groups the subframes SN=10 and SN=12 into one data block for transmission, and records the data block as the data block 3.

STA2 receives an A-MPDU, and STA2 detects that the bit 2 and the bit 4 of the data block indication bitmap are set to 1, and the other bits are all set to 0.

STA2 has locally cached a data block 3. According to the locally recorded length L3 of the data block 3, STA2 regards the part of data, the length of which is L3, in the beginning of the subframes in the A-MDPU as the data block 3, and performs joint decoding on this data block 3 and the locally cached data block 3.

STA2 judges that the subframe group corresponding to the bit 4 is a newly transmitted group according to the new transmission indication in the A-MPDU or based on the fact that the data block 5 corresponding to the bit 4 of the data block indication bitmap is not locally cached, then STA2 groups the subframes which are not correctly received in the newly transmitted group into a data block 5, records the length of the data block 5, and returns an acknowledgement frame of the A-MPDU.

In a wireless network, one or more data blocks are carried in an A-MPDU transmitted by a station, wherein each data block is composed of one or more data subframes, and each data subframe may be an A-MPDU subframe or a codeword.

A data block identifier may be an HARQ ID, a transmission ID, or an A-MPDU ID.

The A-MPDU carries an acknowledgement indication bit for indicating whether an acknowledgement for the previous transmission of the data block has been received from the receiver. The acknowledgement indication bit carried in the data packet is different from the acknowledgement indication bitmap described above, and the acknowledgement indication bit is not bound to the data block indication bitmap.

The receiver receives the A-MPDU, and learns, according to the indication of the acknowledgement indication bit, whether the sender has correctly received the acknowledgement for the previous transmission of the data block in the A-MPDU from the receiver.

When the acknowledgement indication bit indicates that the acknowledgement for the previous transmission of the data block in the A-MPDU has been received from the receiver, it can be learnt that the data block in the A-MPDU includes an A-MPDU subframe which is received incorrectly or a codeword which is received incorrectly in the corresponding previous transmission.

When the acknowledgement indication bit indicates that the acknowledgement for the previous transmission of the data block in the A-MPDU has not been received from the receiver, it can be learnt that the data block in the A-MPDU includes all A-MPDU subframes or all codewords in the corresponding previous transmission.

When all the data subframes in the data block identified by the data block identifier are correctly received, or the maximum number of retransmissions or the maximum retransmission time of the data subframes is reached, the receiver or the sender may release the HARQ process of the data block.

For example, STA1 transmits to STA2 an A-MPDU1 including subframes with SN=1, 2, 3, 4, and 5. When the A-MPDU1 is used as the initial transmission of the HARQ process with the HARQ ID=1, the value of the acknowledgement indication bit carried in the A-MPDU1 is a reserved value. In this case, the subframes with SNs equal to 1, 2, 3, 4, and 5 form the data block 1 (the data block identifier is the HARQ ID).

STA2 receives the A-MPDU1, correctly receives the subframes with SN=1, 2 and 3, and reports the reception status to STA1 in the form of an acknowledgement frame 1.

STA1 receives the acknowledgement frame 1, and learns, according to the reception status indicated in the acknowledgement frame 1, that the subframes with SN=4 and 5 are not correctly received, and groups the subframes with SN=4 and 5 into a data block 1 (the data block identifier is the HARQ ID).

STA1 transmits to STA2 an A-MPDU2 including a data block 1, and an acknowledgement indication bit in the A-MPDU2 is set to a special value (for example, 1), for indicating that the acknowledgement frame 1 has been received.

STA2 receives the A-MPDU2, and determines that STA1 has received the acknowledgement frame 1 according to the fact that the value of the acknowledgement indication bit in the A-MPDU2 has been set to a special value, so as to learn that the A-MPDU2 includes subframes which are not correctly received in the previous transmission (A-MPDU1) of the data block 1, that is, the data block 1 in the A-MPDU2 includes subframes with SN=4 and 5.

For example, if STA1 does not receive the acknowledge frame 1, STA1 sets the value of the acknowledgment indication bit contained in the A-MPDU2, which includes the data block 1 and is transmitted to STA2, to another special value, e.g., 0, to indicate that no acknowledgment of A-MPDU1 is received.

STA2 receives the A-MPDU2, and determines, according to a set value of the acknowledgement indication bit in the A-MPDU2, that STA1 does not receive an acknowledgement frame 1, so as to learn that the A-MPDU2 includes all subframes of a previous transmission (A-MPDU1) of the data block 1, that is, the data block 1 in the A-MPDU2 includes the subframes with SN=1, 2, 3, 4 and 5.

In a wireless network, one or more data blocks are carried in an A-MPDU transmitted by a station, wherein each data block is composed of one or more data subframes, and each data subframe may be an A-MPDU subframe or a codeword.

The A-MPDU carries an acknowledgement indication bitmap, and each bit in the acknowledgement indication bitmap is used for indicating whether the acknowledgement for the previous transmission of the data block corresponding to this bit is correctly received from the receiver, for example, if bit i is set to 1, it indicates that the acknowledgement for the previous transmission of the data block (i+1) is correctly received from the receiver, as shown in FIG. 6.

After the sender STA1 transmits an A-MPDU in which the bit i of the data block indication bitmap is set to 1,
1) if an acknowledgement frame (including a block acknowledgement frame) replied by a receiver STA2 is received, when STA1 subsequently transmits an A-MPDU carrying a data block corresponding to the bit i in the data block indication bitmap, STA1 sets the bit i in the acknowledgement indication bitmap as a special value (for example, 1);
2) if the acknowledgement frame (including a block acknowledgement frame) replied by the receiver STA2 is not received, when STA1 subsequently transmits an A-MPDU carrying a data block corresponding to the bit i in the data block indication bitmap, STA1 sets the bit i in the acknowledgement indication bitmap to a special value (for example, 0);
3) if the A-MPDU transmitted by STA1 does not carry the data block corresponding to the bit i in the data block indication bitmap, then the bit i in the acknowledgement indication bitmap is a reserved value.

When receiving the above A-MPDU, the receiver STA2 may perform one of the following operations according to the data block indication bitmap and the set values of the corresponding bits in the acknowledgement indication bitmap.

At S1301, STA2 receives an A-MPDU.

At S1302, STA2 judges whether the bit i in the data block indication bitmap is set to 1, if yes, proceed to S1303, otherwise, proceed to S1306.

At S1306, STA2 ignores the value of the bit i in the acknowledgement indication bitmap.

At S1303, STA2 judges whether a data block corresponding to the bit i in the data block indication bitmap is locally cached, if yes, proceed to S1304, otherwise proceed to S1307.

At S1307, respectively for a data block (i+1) and a data block (i+1)_a, if the bit i in the acknowledgement indication bitmap indicates that a corresponding acknowledgement frame is correctly received, for example, if the bit i is set to 1, STA2 performs joint decoding on the data block (i+1) and a locally cached data block (i+1), caches the data block subjected to the joint decoding, and identifies the data block subjected to the joint decoding as a data block number (i+1)_a; at the same time, STA2 caches all subframes which are not correctly received after the joint decoding, and identifies these subframes as a data block number (i+1);

At S1304, STA2 judges whether the bit i of the acknowledgement indication bitmap is equal to 1, and if so, proceed to S1305, otherwise proceed to S1308;

At S1305, if the bit i in the acknowledgement indication bitmap indicates that no corresponding acknowledgement frame is received, for example, if the bit i is set to 0, STA2 performs joint decoding on the data block (i+1)_a and the locally cached data block (i+1)_a, caches the data block subjected to the joint decoding, and identifies the data block subjected to the joint decoding as a data block number (i+1)_a; at the same time, STA2 caches all subframes which are not correctly received after the joint decoding, and identifies these subframes as a data block number (i+1);

At S1308, if a data block corresponding to the bit i in the data block indication bitmap is not locally cached, STA2 simultaneously caches a certain data block corresponding to a certain bit i in the data block indication bitmap carried in the A-MPDU or all subframes in a newly transmitted group, and identifies the data block or these subframes as a data block number (i+1)_a; and STA2 caches the data block or the subframes which are not correctly received in the newly transmitted group, and identifies the data block or the subframes which are not correctly received in the newly transmitted group as a data block number (i+1).

If the bit i in the data block indication bitmap is set to 0, the set value of the bit i in the acknowledgement indication bitmap is ignored.

STA2 optionally records the lengths of the data block (i+1)_a and the data block (i+1), which are L(i+1)_a and L(i+1), respectively. In some exemplary implementations, STA2 uses these length values to obtain the corresponding data blocks in the A-MPDU.

When all the data blocks are correctly received, or when the automatic repeat request process expires, the data block numbers are reset, and the corresponding cache area is cleared.

STA1 transmits an A-MPDU to STA2, wherein Sequence Numbers (SNs) of the subframes of the A-MPDU are 1, 2, 3, 4, and 5 in order. STA1 sets bit 0 in a data block indication bitmap carried in the A-MPDU to 1, and sets all the other bits to 0. Each bit in an acknowledgement indication bitmap is set to an arbitrary value.

STA2 receives the A-MPDU1. Since the bit 0 in the data block indication bitmap carried in the A-MPDU1 is set to 1, and a data block corresponding to the bit 0 is not locally cached, STA1 caches all subframes corresponding to the bit 0 in the A-MPDU1, records a data block number 1a, returns to STA1 an acknowledgement frame BA1 which indicates that the subframes with SN=2, SN=4, and SN=5 are correctly received, caches the remaining subframes that are not correctly received, and records these subframes as a data block 1. STA2 optionally further records the length values of the data block 1a and the data block 1.

STA1 receives the BA1, and transmits an A-MPDU2 to STA2, wherein the A-MPDU2 carries subframes with SN=1 and SN=3, and carries a newly transmitted group including subframes with SNs=6, 7, 8 and 9 in order. In this case, STA1 sets the bit 0 and the bit 2 in the data block indication bitmap carried in the A-MPDU2 to 1, and sets all the other bits to 0. STA1 sets the bit 0 in the acknowledgement indication bitmap to 1, and sets other bits to an arbitrary value.

Figure 7:
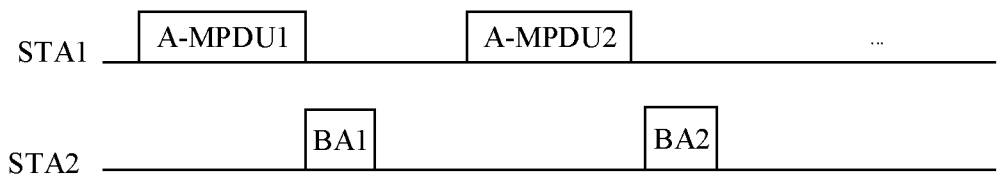
FIG. 7 is a schematic diagram of exchange of six frames according to some embodiments of the present disclosure.

STA2 receives the A-MPDU2. According to the setting of the data block indication bitmap, for example, the bit 0 is set to 1, STA2 learns that STA1 carries the data block 1 or the data block 1a corresponding to the bit 0. According to the data block indication bitmap carried in the A-MPDU2, for example, the bit 0 is set to 1, STA2 learns that STA1 correctly receives the acknowledgement frame BA1 (for the data block 1) transmitted previously by STA2, then STA2 obtains the data block 1 in the A-MPDU2 according to the length of the data block 1 cached locally. According to the fact that the bit 2 in the data block indication bitmap is set to 1 and that the data block 3 is not locally cached, or according to the new transmission indication information carried in the A-MPDU2, STA2 learns that the remaining subframes except the data block 1 in the A-MPDU3 form a newly transmitted group, and STA2 parses the newly transmitted group and returns an acknowledgement frame BA2 to STA1. The above frame exchange is shown in FIG. 7.

On the basis of the sixth example, when STA2 returns the BA2 to STA1, the BA2 indicates that the subframes with SN=6 and SN=7 are correctly received. STA2 groups the remaining subframes, which are not correctly received, other than the data block 1 into the data block 3, caches the data block 3, and records the length of the data block 3 as L3. STA2 optionally further caches a newly transmitted group composed of subframes with SNs=6, 7, 8 and 9 in order as an alternative group of the data block 3, records this alternative group as a data block 3a, and records the length of the data block 3a.

When STA1 does not receive the BA2, STA1 transmits to STA2 an A-MPDU3 carrying subframes with SNs of 6, 7, 8 and 9 in order, sets the bit 2 in the data block indication bitmap of the A-MPDU3 to 1, and sets the bit 2 in the acknowledgement indication bitmap to 0, indicating that no acknowledgement for the data block 3 previously transmitted is received, that is, the BA2 is not received.

Figure 8:
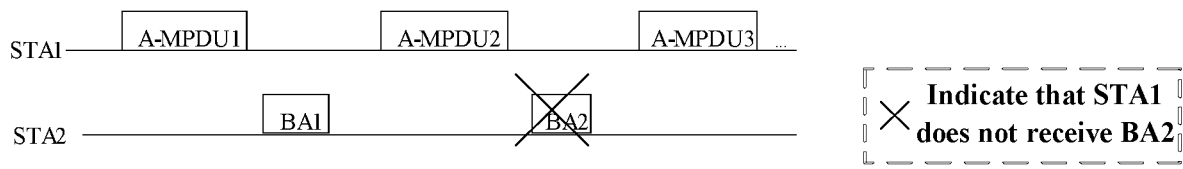
FIG. 8 is a schematic diagram of exchange of seven frames according to some embodiments of the present disclosure.

When receiving the A-MPDU3, STA2 learns that the A-MPDU3 carries the data block 3 or the data block 3a according to the fact that the bit 2 in the data block indication bitmap is set to 1. STA2 learns that the BA2 is not received according to the fact that the bit 2 in the acknowledgement indication bitmap is set to 0, and therefore STA2 further confirms that the A-MPDU3 carries the data block 3a. Consequently, STA2 obtains the data block 3a in the A-MPDU3 according to the length of the data block 3a, and performs joint decoding on the obtained data block 3a and the cached data block 3a. The above frame exchange is shown in FIG. 8.

STA1 transmits an A-MPDU1 to STA2, wherein the A-MPDU1 includes Sequence Numbers (SNs) of subframes which are 1, 2, 3, 4, and 5 in order, and is an initial transmission. STA1 sets the bit 0 in the data block indication bitmap carried in the A-MPDU1 to 1, and sets all the other bits to 0. Each bit in the acknowledgement indication bitmap is set to an arbitrary value.

STA2 receives the A-MPDU1. Since the bit 0 in the data block indication bitmap carried in the A-MPDU1 is set to 1, and STA2 has not cached the data block 1 locally, STA2 caches all subframes corresponding to the bit 0, records these subframes as a data block 1a, records the length of the data block 1a as L1a, and returns to STA1 an acknowledgement frame BA1 indicating that the subframes with SN=2, SN=4 and SN=5 are received correctly. STA2 caches the remaining subframes which are not correctly received, records the remaining subframes as a data block 1 and records the length of the data block 1 as L1.

STA1 receives BA1, and transmits an A-MPDU2 to STA2, wherein the A-MPDU2 only carries subframes with SN=1 and SN=3. STA1 sets the bit 0 in the data block indication bitmap carried in A-MPDU2 to 1, and sets all the other bits to 0. STA1 sets the bit 0 in the acknowledgement indication bitmap to 1, and sets the other bits to an arbitrary value.

STA2 receives the A-MPDU2, and learns from the data block indication bitmap that the A-MPDU2 carries the data block 1 or the data block 1a, and learns from the acknowledgement indication bitmap that STA1 has received the BA1. Consequently, STA2 regards that the A-MPDU2 carries the data block 1. STA2 acquires the data block 1 in the A-MPDU2 according to the recorded length of the data block 1, performs joint decoding on the acquired data block 1 and the locally cached data block 1, caches the data block subjected to the joint decoding, rerecords the data block subjected to the joint decoding as a data block 1a, and records the length of the data block 1a as L1a. After the joint decoding, STA2 correctly decodes the subframe with SN=1, STA2 replies to STA1 with a BA2, in which the bit corresponding to SN=1 in the BA2 is set to 1. STA2 caches the subframes except the subframe with SN=1 which is correctly received in the data block after the joint decoding, rerecords these cached subframes as a data block 1 and records the length of the data block 1 as L1.

STA1 does not receive the BA2, and does not learn about the indication regarding SN=1 being received correctly in the BA2. STA1 transmits an A-MPDU3 to STA2, wherein the A-MPDU3 carries subframes with SN=1 and SN=3; in the data block indication bitmap, the bit 0 is set to 1, and all the other bits are set to 0; in the acknowledgement indication bitmap, the bit 0 is set to 0, and all the other bits are set to an arbitrary value.

STA2 receives the A-MPDU3, and learns, according to the data block indication bitmap, that a data block 1 or a data block 1a is carried. STA2 learns from the acknowledgement indication bitmap that STA1 does not receive the BA2, thus STA2 regards that A-MPDU3 carries data block 1a, acquires the data block 1a in the A-MPDU3 according to the recorded length of the data block 1a, performs joint decoding on the acquired data block 1a and the locally cached data block 1a, caches the data block subjected to the joint decoding, records the data block subjected to the joint decoding as a data block 1a, and records the length of the data block 1a as L1a. STA2 correctly decodes the subframe with SN=1 after the joint decoding, and therefore STA2 replies to STA1 with BA3, in which the bit corresponding to SN=1 in BA3 is set to 1. STA2 caches subframes except the subframe with SN=1 which is correctly received in the data block subjected to the joint decoding, records these cached subframes as a data block 1, and records the length of the data block 1 as L1.

STA1 receives the BA3, and transmits an A-MPDU4 to STA2, wherein the A-MPDU4 carries a subframe with SN=3; in the data block indication bitmap, the bit 0 is set to 1, and all the other bits are set to 0; and in the acknowledgement indication bitmap, the bit 0 is set to 1, and all the other bits are set to an arbitrary value.

STA2 receives the A-MPDU4, and learns, according to the data block indication bitmap, that a data block 1 or a data block 1a is carried. STA2 learns, according to the acknowledgement indication bitmap, that STA1 receives the BA2, therefore STA2 determines that the A-MPDU4 carries the data block 1, acquires the data block 1 in the A-MPDU4 according to the recorded length of the data block 1, and performs joint decoding on the acquired data block 1 and the locally cached data block 1.

The A-MPDU transmitted by the sender carries presence indication information for data identification information or data block reception status information, so as to indicate whether the transmitted A-MPDU carries data identification information or data block reception status information.

A sender decides to retransmit the subframes according to the received acknowledge information, and specifically, retransmits all the subframes received incorrectly in the A-MPDU.

The receiver caches all the subframes collectively as a data block 1, and caches all subframes which are not correctly received as a data block 1a. In addition, the receiver optionally records the lengths of the data block 1 and the data block 1a as L1 and L1a.

If the receiver locally records the length, when receiving the retransmission frame of the A-MPDU, the receiver, according to the length of all subframes in the acquired retransmission frame, performs the corresponding joint decoding. For example, if the length of all subframes in the acquired retransmission frame is L1, the receiver performs the joint decoding on all subframes in the retransmission frame and the data block 1. If the length of all subframes in the received retransmission frame is L1a, the receiver performs the joint decoding on all subframes in the retransmission frame and the data block 1a.

If the receiver does not locally record the length, the receiver successively matches all the subframes in the obtained retransmission frame with the locally cached data block 1 and data block 1a, finds the cached data block with the matching length and performs joint decoding on the matched data blocks.

In the mechanism of performing joint decoding on the data blocks according to the rules described above, during multiple retransmissions of a certain data block, the sender does not update the size of the data block, the number of subframes carried and the SNs of the subframes, and the sender may update the redundancy versions of the data block.

STA1 transmits an A-MPDU1 to STA2, wherein the A-MPDU1 includes Sequence Numbers (SNs) of subframes which are 1, 2, 3, 4, and 5 in order. STA1 sets the bit 0 of the data block indication bitmap carried in the A-MPDU to 1 and sets all the other bits to 0.

STA2 receives the A-MPDU1. Since the bit 0 in the data block indication bitmap carried in the A-MPDU1 is set to 1, and STA2 does not locally cache the data block 1, STA2 returns to STA1 an acknowledgement frame BA1 indicating that the subframes with SN=2, SN=4 and SN=5 are correctly received, caches the remaining subframes which are not correctly received, and records these remaining subframes as the data block 1.

When receiving the BA1, STA1 learns that the subframes SN=1 and SN=3 are not correctly received, STA1 groups the subframes SN=1 and SN=3 into a data block 1, and transmits an A-MPDU2 including a retransmitted data block 1.

STA2 receives the A-MPDU2, acquires the data block 1, and correctly decodes the subframe with SN=1. STA2 replies to STA1 with a BA2, and the setting of the BA2 may be one of the following settings.

1) The bit corresponding to the subframe with SN=1 in the BA2 is set to 1 to indicate that the subframe with SN=1 is received correctly; or the bit corresponding to the subframe SN=1 in the BA2 is still set to 0.

2) After STA1 receives the BA2, even if STA1 learns that the subframe with SN=1 is correctly received, since other subframe(s) (here, a subframe with SN=3) in the same data block is not correctly received, when STA1 retransmits the data block 1, the subframes with SN=1 and SN=3 are transmitted together.

In the subsequent retransmission, STA1 always transmits the subframes with SN=1 and SN=3 together until the subframes with SN=1 and SN=3 are all correctly received, or the maximum number of retransmissions is reached or the corresponding hybrid automatic repeat request process ends.

The MAC layer of the receiver informs the physical layer of the length of each data block, and the physical layer performs the joint decoding.

A sender transmits an A-MPDU to a receiver, wherein the A-MPDU includes one or more A-MPDU subframes, and a physical frame header of the A-MPDU further carries indication information of an identifier (ID) of each carried subframe.

In some exemplary embodiments, the ID may be an HARQ process ID or a subframe SN.

Based on a reception status of the A-MPDU, when retransmitting subframe(s) which is not correctly received, STA1 carries indication information of ID(s) of the subframe(s) in a physical frame header of the data packet including the incorrectly received subframe(s).

For example, STA1 transmits an A-MPDU1 to STA2, wherein a physical frame header of the A-MPDU1 includes indication information for indicating that the A-MPDU1 includes subframes with ID 1, 2, 3, 4, and 5.

STA2 returns an acknowledgement frame to STA1, indicating that the subframes with ID 2, 4 and 5 are correctly received.

After receiving the acknowledgement frame, STA1 retransmits subframes with ID 1 and 3 to STA2, wherein the subframes with ID 1 and 3 are carried in an A-MPDU2, and a physical frame header of the A-MPDU2 carries indication information for indicating that the A-MPDU2 includes subframes with ID 1 and 3.

In conclusion, by implementing the method using an A-MPDU subframe as a basic retransmission unit, when a hybrid automatic repeat request mechanism is executed, the sender does not need to retransmit correctly received subframe(s) in an A-MPDU, thereby effectively utilizing transmission resources and further improving transmission efficiency.

Figure 11:
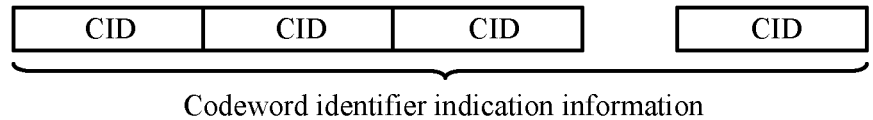
FIG. 11 is a schematic diagram (II) of codeword identifier indication information according to some embodiments of the present disclosure.

STA1 transmits a data packet to STA2, wherein the data packet includes one or more codewords. The data packet further carries codeword identifier indication information (as shown in FIG. 11). The codeword identifier indication information may be carried in a physical frame header, but is not limited to being carried in a physical frame header.

The codeword identifier indication information may be bitmap information, or one or more codeword identifiers.

When the codeword identifier indication information is bitmap information, each bit corresponds to one codeword ID (CID), and the value of each bit is used for indicating whether the data packet includes a codeword of the corresponding codeword identifier.

When the codeword identifier indication information is one or more codeword identifiers, it indicates that the data packet includes the codeword(s) identified by the one or more codeword identifiers, as shown in FIG. 11.

The following examples are specifically described.

Example 1

STA1 transmits a data packet 1 to STA2, wherein the data packet carries codeword identifier indication information, and the codeword identifier indication information indicates that the data packet 1 includes codewords with CID=1, 2 and 3.

STA2 correctly receives the codeword with CID=2, and STA2 reports the reception status of the data packet 1 to STA1.

After receiving the reception status of the data packet 1 reported by STA2, STA1 determines that the codewords that need to be retransmitted subsequently are codewords with CID=1 and CID=2.

When STA1 does not receive the reception status of data packet 1 reported by STA2, STA1 determines that the codewords that need to be retransmitted subsequently are the codewords with CID=1, 2 and 3.

STA1 transmits a data packet to STA2, wherein the data packet includes one or more codewords. The data packet further includes an acknowledgement indication bit for indicating whether the acknowledgement from STA2 for the previous transmission is received.

When an acknowledgement indication bit is set to a first special value, it indicates that acknowledgement from STA2 regarding previous transmission is received; otherwise, it indicates that no acknowledgement is received from STA2 for the previous transmission.

When the acknowledgement indication bit is set to the first special value, it may also indicate that the data packet includes a part of codewords transmitted previously; otherwise, it may indicate that the data packet includes all the codewords transmitted previously.

Example 2

STA1 transmits a data packet 1 to STA2, wherein the data packet 1 includes codewords with CID=1, 2 and 3.

STA2 correctly receives the codeword with CID=2, and STA2 reports the reception status of the data packet 1 to STA1.

When STA1 does not receive the reception status of data packet 1 reported by STA2, STA1 determines that the codewords that need to be retransmitted subsequently are the codewords with CID=1, 2 and 3.

STA1 transmits a data packet 2 to STA2, wherein the data packet 2 carries an acknowledgement indication bit for indicating whether acknowledgement for the previous transmission is received, for example, the acknowledgement indication bit in the data packet 2 is set to a special value (for example, 0), indicating that no acknowledgement for the previous transmission is received. The data packet 2 includes all the codewords transmitted previously, that is, includes the codewords with CID=1, 2, and 3.

STA2 receives the data packet 2, and learns that the data packet 2 does not receive acknowledgement for the data packet 1 according to the fact that the acknowledgement indication bit in the data packet 2 is set to a special value, and therefore learns that the codewords carried in the data packet 2 include codewords with CID=1, 2 and 3.

A sender transmits a data packet to a receiver, wherein the data packet includes one or more codewords. The data packet also carries full code indication information used for indicating whether the current transmission includes all codewords transmitted previously. For example, the full code indication information is set to a preset value to indicate that the current data packet includes all codewords in a certain transmission, and the full code indication information is set to a value other than the preset value to indicate that the current data packet only includes all codewords which are not correctly received in a certain transmission.

The certain transmission is identified using a hybrid automatic repeat request process identifier (ID), or a transmission ID, or a PPDU ID, or specifically refers to the previous transmission.

The receiver receives the data packet, and determines, according to the full code indication information carried in the data packet, whether the current data packet includes all the codewords in the corresponding transmission. The corresponding transmission is identified by a Hybrid Automatic Repeat Request (HARQ) process ID, or a transmission ID, or a PPDU ID, or is specifically the previous transmission. The following examples are provided for better understanding.

Example 1

STA1 transmits a data packet 1 to STA2, wherein the data packet includes codewords with CID=1, 2 and 3.

STA2 receives the data packet 1, correctly decodes the codeword with CID=3, and STA2 transmits an acknowledgement to STA1.

STA1 receives the acknowledgement from STA2, and learns that codewords with CID=1 and 2 are not correctly received.

An STA 1 transmits a data packet 2 to an STA 2, wherein the data packet 2 includes retransmission of codewords with CID=1 and 2, and the data packet 2 also includes full code indication information set to a special value (for example, 0) for indicating that the data packet 2 carries a part of codewords in the data packet 1.

STA2 receives the data packet 1, and learns, according to the full code indication information, that data packet 2 includes codewords with CID=1 and 2, and does not include codeword with CID=3.

Example 2

STA1 transmits a data packet 1 to STA2, wherein the data packet includes codewords with CID=1, 2 and 3.

STA2 receives the data packet 1, correctly decodes the codeword with CID=3, and STA2 transmits an acknowledgement to STA1.

If STA1 does not receive an acknowledgement from STA2, STA1 regards that codewords with CID=1, 2 and 3 are not correctly decoded.

STA1 transmits a data packet 2 to STA2, wherein the data packet 2 includes retransmission of codewords with CID=1, 2 and 3, and the data packet 2 also includes full code indication information set to a special value (for example, 1), for indicating that the data packet 2 carries all codewords in the data packet 1.

STA2 receives the data packet 1, and learns that data packet 2 includes all the codewords in the data packet 1, i.e., includes the codewords with CID=1, 2 and 3, according to the full code indication information.

A sender transmits a data packet to a receiver, wherein the data packet corresponds to a Hybrid Automatic Repeat Request (HARQ) or corresponds to a transmission process. The former is identified by an HARQ ID, and the latter is identified by a transmission ID (TID).

The data packet carries data block identification information, and the data block identification information may correspond to an HARQ ID or a TID. The value of the data block identification information is used for indicating whether the current data packet includes a data block of a corresponding HARQ ID or a corresponding TID.

The data block of the corresponding HARQ ID or the corresponding TID is one of:

a) All A-MPDU subframes or all codewords transmitted previously corresponding to the HARQ ID or TID; or b) A-MPDU subframe(s) or codeword(s), which is not correctly received in the previous transmission, corresponding to the HARQ ID or TID.

In the embodiments, the data packet may further carry data block reception status information, wherein the data block reception status information may be an acknowledgement indication bit used for indicating whether an acknowledgement frame for a previous transmission (identified by an HARQ ID or a TID) of a data block carried in the data packet is received; or the data block reception status information is a full/partial data subframe indication for indicating that the data packet includes all data subframes (A-MPDU subframes or codewords) of the previous transmission corresponding to the HARQ ID or TID, or for indicating that the data packet includes data subframes (A-MPDU subframes or codewords) which are not correctly received in the previous transmission corresponding to the HARQ ID or TID.

On the basis of the foregoing embodiment, when receiving a data packet, a receiver determines, according to the data block identification information carried in the data packet, the data block(s) carried in the data packet.

In the embodiments, it is also possible to determine whether the sender receives an acknowledgement frame of the previous transmission of the one or more data blocks carried in the data packet according to the data block reception status information carried in the data packet, so as to determine that the data block includes all A-MPDU subframes or all codewords of the data block corresponding to the HARQ ID or TID in a previous transmission, or that the data block includes incorrectly received A-MPDU subframe(s) or codeword(s) of the data block corresponding to the HARQ ID or TID in a previous transmission.

In example 1, an STA1 transmits a data packet 1 to an STA2, wherein the data packet 1 corresponds to an HARQ ID 1, and further includes subframes with SN=1, 2, 3, 4 and 5.

STA2 receives the data packet 1, correctly receives the subframes with SN=2 and 4, and transmits an acknowledgement frame 1 to STA1.

STA1 determines, according to the acknowledge frame 1, that the subframes with SN=1, 3 and 5 are not correctly received, and therefore STA1 groups (configures) the subframes with SN=1, 3 and 5 as a data block, and the data block is correspondingly identified as HARQ ID1.

STA1 transmits a data packet 2 to STA2, sets a bit corresponding to the HARQ ID1 in the data block identification information in the data packet 2 to a special value (for example, 1), indicating that the data packet 2 includes a data block corresponding to the HARQ ID1.

In this example, the data packet 2 may further include data block reception status information set to a special value (for example, 1), for indicating that the acknowledgement frame 1 is received.

STA2 receives the data packet 2, and determines, according to the acknowledgement indication bit in data packet 2, that STA1 receives the acknowledgement frame 1, so as to learn that the data block corresponding to HARQ ID1 in data packet 2 includes subframes with SN=1, 3 and 5.

In example 2, an STA1 transmits a data packet 1 to an STA2, wherein the data packet 1 corresponds to an HARQ ID 1, and further includes subframes with SN=1, 2, 3, 4 and 5.

STA2 receives the data packet 1, correctly receives the subframes with SN=2 and 4, and transmits an acknowledgement frame 1 to STA1.

If STA1 does not receive the acknowledgement frame 1 or does not correctly decode the data subframe 1, STA1 will group (configure) all subframes in the data packet 1, i.e., subframes with SN=1, 2, 3, 4 and 5, as one data block, and the identifier corresponding to this data block is HARQ ID1.

STA1 transmits a data packet 2 to STA2, and sets the data block identification information in the data packet 2 to a special value to indicate that the data packet 2 includes a data block corresponding to the HARQ ID1.

The data packet 2 may also include an acknowledgement indication bit set to a special value (for example, 0), for indicating that an acknowledgement frame 1 is not received.

STA2 receives the data packet 2, and determines, according to the acknowledgement indication bit in the data packet 2, that STA1 does not receive the acknowledgement frame 1, so as to learn that a data block corresponding to HARQ ID1 in data packet 2 includes subframes with SN=1, 2, 3, 4 and 5.

A MAC layer of a station transmits data block information indication to a PHY layer, wherein the data block information indication includes at least one of: initial position information of data blocks, the length of each data block, the number of data blocks, an initial position of data bits to be stored, the length of the data bits to be stored, and the number of the data bits to be stored.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

A data retransmission device illustrated by a structural block diagram is provided in the embodiments, and the device is used to implement the above embodiments and exemplary implementations, and the details having been described will not be repeated. As used below, the term "module" may implement a combination of software and/or hardware of a predetermined function. Although the device described in the following embodiments is preferably implemented in software, the implementation in hardware or a combination of software and hardware is also possible and contemplated.

Figure 9:
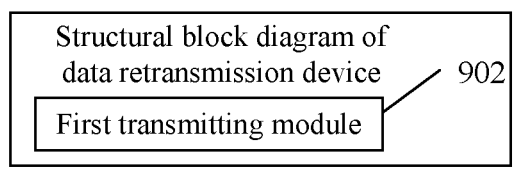
FIG. 9 is a structural block diagram (I) of a data retransmission device according to some embodiments of the present disclosure.

FIG. 9 is a structural block diagram (I) of a data retransmission device according to some embodiments of the present disclosure. As shown in FIG. 9, the device includes a first transmitting module 902. The device is described in detail below.

The first transmitting module 902 is configured to transmit a first data packet, wherein the first data packet includes data block identification information.

By means of the described modules, a sender transmits a first data packet to a receiver, wherein the first data packet includes data block identification information, the data block identification information is used for indicating one or more data blocks carried in the first data packet, and each data block is composed of one or more data subframes; the sender determines one or more data subframes which are not correctly received in the data block based on a reception status transmitted by the receiver, and then retransmits the one or more data subframes which are not correctly received. In this way, only one or more data subframes that are not correctly received are retransmitted, and the correctly received data subframes will not be retransmitted. Therefore, the problem in the related art that resources are wasted due to retransmission of data subframes can be solved, and the effects of saving resources and improving the retransmission efficiency can be achieved.

It should be noted that the data subframe may be a codeword corresponding to a block code or an A-MPDU subframe.

It should be noted that, the first data packet in the embodiments is an A-MPDU in some exemplary implementations, wherein the A-MPDU is formed by a plurality of A-MPDU subframes (or subframes for short), and each A-MPDU subframe is identified by an SN. Alternatively, the A-MPDU is composed of a plurality of codewords, and each codeword is identified by a Codeword ID (CID).

In an exemplary embodiment, the A-MPDU further carries data block identification information. The sender and the receiver may be two STAs, and the STA may be an AP STA or a non-AP STA.

It should be noted that, in the related art, in a wireless local area network, a sender transmits data in an Aggregate Medium Access Control (MAC) Protocol Data Unit (A-MPDU). The A-MPDU includes a plurality of A-MPDU subframes) or is composed of codewords corresponding to a plurality of block codes. An A-MPDU in the related art does not carry data block identification information.

In addition, when the data block identification information is a data block indication bitmap, each bit in the data block indication bitmap corresponds to a data block number for identifying a data block. The value of the bit is used for indicating whether the first data packet carries a data block corresponding to the data block number. For example, each bit of the data block indication bitmap carried in the A-MPDU corresponds to a data block number and is used for indicating whether a data block corresponding to the data block number is carried. One data block is composed of one or more data subframes. For example, the data block indication bitmap includes N bits, in which bits 0 to (N−1) correspond to data block numbers 1 to N, respectively, as shown in FIG. 4. When the bit i is set to 1, it indicates that the current A-MPDU includes a data block with a data block number (i+1).

In an exemplary embodiment, the data block number (also referred to as a data block identifier) may be at least one of: a Hybrid Automatic Repeat Request (HARQ) process number, a transmission identifier, an A-MPDU identifier, a packet number, and a PPDU (PHY Protocol Data Unit) identifier, but is not limited thereto.

When the data block number is an HARQ process number, the data block identification information may be a bitmap, wherein each bit in the bitmap corresponds to an HARQ process number, and the value of the bit is used for indicating whether the first data packet carries a data block corresponding to the HARQ process number. Alternatively, the data block identification information may be one or more HARQ process numbers, and is used for indicating whether the first data packet carries one or more data blocks corresponding to the one or more HARQ process numbers.

In an exemplary embodiment, the data block corresponding to the HARQ process number includes all the A-MPDU subframes previously transmitted by the HARQ process or only the A-MPDU subframes not correctly received.

In an exemplary embodiment, a reception status of a first data packet is determined in the following manner. The sender receives a first acknowledgement frame corresponding to the first data packet from the receiver, wherein the first acknowledgement frame is used for indicating whether the receiver receives a first data subframe. The sender determines, based on the first acknowledgement frame, one or more data subframes which are not correctly received in the first data packet, so as to determine one or more data subframes to be retransmitted.

In an exemplary embodiment, the one or more data subframes or codewords that are not correctly received may be determined based on SNs or CIDs carried in the first acknowledgement frame. If the value of the bit in the first acknowledgement frame is 1, it may be determined that the data subframe corresponding to the bit is correctly received, and a data subframe corresponding to the bit with a value set to 0 is a data subframe that is not correctly received, so that one or more data subframes to be retransmitted can be determined. Alternatively, the sender may determining, based on SN(s) or CID(s) of correctly received data subframe(s) carried in the first acknowledgement frame, which data subframes are not correctly received, so as to determine the one or more data subframes to be retransmitted. During retransmission, only one or more data subframes needing to be retransmitted are retransmitted, thereby saving retransmission resources.

In an exemplary embodiment, if the sender does not receive, within a predetermined time interval, the first acknowledgement frame corresponding to the first data packet and transmitted by the receiver, it may be determined that the first data packet is not correctly received. The data subframes which are not correctly received in the first data packet may be determined as the data subframes to be retransmitted. The predetermined time interval may be set based on a property of the data packet, for example, 5 s or 10 s.

In an exemplary embodiment, the cases where the sender does not receive the first acknowledgement frame corresponding to the first data packet and transmitted by the receiver may include two cases, one is that the receiver does not receive the first data packet and does not transmit the first acknowledgement frame naturally; and the second one is that although the receiver transmits the first acknowledgement frame, the first acknowledgement frame is lost in the transmission process.

It should be noted that the first data packet may be a data packet transmitted for the first time (initial transmission data packet), that is, the first data packet does not include retransmitted data subframes.

In an exemplary embodiment, the one or more data subframes to be retransmitted are retransmitted in the following manner. The one or more data subframes to be retransmitted are configured (arranged) in a first data block according to an order of SN(s) or CID(s), wherein the first data block only includes the one or more data subframes to be retransmitted. The first data block is set in a second data packet, and the value of the data block identification information in the second data packet is set to a first preset value for indicating that the second data packet includes the first data block. The second data packet is transmitted.

It should be noted that, the second data packet is a data packet which is transmitted not for the first time, since one or more data subframes to be retransmitted are carried therein. Of course, the second data packet may also include other data blocks or/and new data subframes, that is, the second data packet may further include a third data block, wherein the third data block includes second data subframes arranged in a preset order (for example, the second data subframes may be arranged in an ascending order or a descending order of SN(s) or CID(s)), and the value of the bit corresponding to the third data block in the data block indication bitmap of the second data packet is set to a first preset value. The first data block and the third data block are arranged according to a preset order. For example, when the data block identification information is a data block indication bitmap, the first data block and the third data block are arranged according to an order of positions of bits to which the first data block and the third data block respectively correspond in the data block indication bitmap.

For example, when the A-MPDU is not an initial transmission frame transmitted by STA1 to STA2, the A-MPDU may include newly transmitted data block(s) or retransmitted data block(s), or include both the newly transmitted data block(s) and the retransmitted data block(s). One or more of the following operations are performed.

When the A-MPDU simultaneously includes the newly transmitted data block(s) and the retransmitted data block(s), the newly transmitted data block(s) and the retransmitted data block(s) are arranged according to a preset order.

When the A-MPDU includes a plurality of retransmitted data blocks, the retransmitted data blocks are sequentially arranged according to a preset order.

The data subframes in the retransmitted data block(s) in the A-MPDU are arranged in a certain order, for example, in an ascending order of SNs.

STA1 groups, according to a received acknowledgement indication, one or more data subframes which are not correctly received in the current transmission into the same data block.

It should be noted that all the data blocks carried in the second data packet may also be newly transmitted data blocks, that is, the second data packet does not carry data blocks carrying data subframes to be retransmitted.

In an exemplary embodiment, in a case where the first data packet includes a plurality of data blocks, the plurality of data blocks are arranged according to positions of bits, to which the data blocks correspond, in the data block identification information.

In an exemplary embodiment, the second data packet further includes at least one of: data block reception status information, wherein the data block reception status information is used for indicating that the second data packet includes all data subframes in the one or more data blocks of the first data packet, or includes data subframes that are not correctly received in the one or more data blocks of the first data packet.

In some exemplary embodiments, the data block reception status information may be an acknowledgement bitmap, for example, when STA2 receives a first data subframe, STA2 transmits a first acknowledgement frame to STA1, and when STA1 transmits a second data packet to STA2, the value of the bit in an acknowledgement indication bitmap carried in the second data packet is set to 1 for indicating that the first acknowledgement frame is received, and values of other bits are set to arbitrary values.

Figure 10:
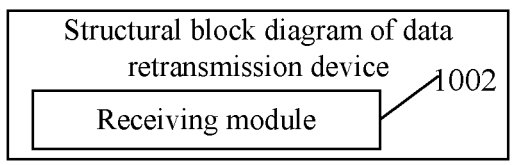
FIG. 10 is a structural block diagram (II) of a data retransmission device according to some embodiments of the present disclosure.

FIG. 10 is a structural block diagram (II) of a data retransmission device according to some embodiments of the present disclosure. As shown in FIG. 10, the device includes a receiving module 1002. The device is described in detail below.

The receiving module 1002 is configured to receive a first data packet, wherein the first data packet includes data block identification information.

By means of the various modules, a receiver receives a first data packet transmitted by a sender, wherein the first data packet includes data block identification information, the data block identification information is used for indicating a data block carried in the first data packet, and each data block is composed of one or more data subframes; and the receiver transmits a reception status of the first data subframe after receiving the first data packet. The sender can retransmit one or more incorrectly received data subframes based on the reception status. Therefore, the problem in the related art that resources are wasted due to retransmission of data subframes can be solved, and the effects of saving resources and improving the retransmission efficiency can be achieved.

It should be noted that, the first data packet in the embodiments is an A-MPDU in some exemplary implementations, wherein the A-MPDU includes a plurality of A-MPDU subframes (namely, first data subframes), and each A-MPDU is identified by an SN. Alternatively, the A-MPDU includes a plurality of codewords, and each codeword is identified by a CID.

In an exemplary embodiment, the A-MPDU further carries data block identification information. The sender and the receiver may be two STAs.

It should be noted that, in the related art, in a wireless local area network, a sender transmits data in an Aggregate Medium Access Control (MAC) Protocol Data Unit (A-MPDU). The A-MPDU is composed of a plurality of A-MPDU subframes, and each A-MPDU subframe includes a MAC Protocol Data Unit (MPDU). An A-MPDU in the related art does not carry data block identification information.

In addition, when the data block identification information is a data block indication bitmap, each bit in the data block indication bitmap corresponds to a data block number for identifying the data block, and the value of the bit is used to indicate whether the first data packet carries a data block corresponding to the data block number. For example, each bit of the data block indication bitmap carried in the A-MPDU corresponds to a data block number for indicating whether a data block corresponding to the data block number is carried. One data block is composed of one or more data subframes (subframes). For example, the data block indication bitmap includes N bits, wherein bits 0 to (N−1) correspond to a data block number 1 to a data block number N, as shown in FIG. 4. When the bit i is set to 1, it indicates that a current A-MPDU includes a data block with a data block number (i+1).

In an exemplary embodiment, after receiving the first data packet, the receiver determines, based on the value of the data block identification information, a data block carried in the first data packet. In a case where the first data packet includes a plurality of data blocks, the plurality of data blocks are respectively stored and the lengths of the plurality of data blocks are recorded respectively.

In an exemplary embodiment, after receiving the first data packet, a first acknowledgement frame needs to be transmitted. After receiving the first acknowledgement frame, the sender may determine one or more data subframes to be retransmitted based on an SN or a CID or a bit value in the first acknowledgement frame. For example, when the first data packet A-MPDU1 is an initial transmission frame transmitted by a sender STA1 to a receiver STA2, STA1 sets only the bit 0 in the data block indication bitmap carried in A-MPDU1 to 1, and sets all the other bits to 0. When STA2 receives the A-MPDU1, according to the indication in the data block indication bitmap carried in the A-MPDU1, the A-MPDU1 is judged to only include a data block 1, STA2 can obtain an SN or CID of each correctly received data subframe by decoding, and set the bits corresponding to these SNs or CIDs in the first acknowledgement frame to 1, so as to indicate that the data subframes corresponding to the SNs or CIDs are correctly received. The first acknowledgement frame is transmitted to STA1. In this way, STA1 groups the data subframes that are not correctly received in the data block into one data block, and the data subframes in the data block are arranged in a preset order. For example, all subframes, except for subframes with SN=2, 4 and 5, of the data block 1 carried in the first data packet A-MPDU1 which are not correctly received may be grouped into the data block 1, the data block 1 is cached, and a first acknowledgement frame is replied to STA1, wherein the first acknowledgement frame indicates that the subframes with SN=2, 4 and 5 are correctly received.

It can be seen that the sender can learn which data subframes in a certain data block are correctly received through the received first acknowledgement frame, so as to learn one or more data subframes that are not correctly received, and the sender groups the one or more data subframes that are not correctly received in the data block into one data block, and retransmits the data block. For example, all subframes which are not correctly received in the A-MPDU1 may be grouped into one data block, and subframes with SN=1 and SN=3 which are not correctly received may be grouped into a data block 1, and the data block 1 is retransmitted.

In an exemplary embodiment, after transmitting the first acknowledgement frame to the sender, the receiver continues to receive the second data packet. Based on the data block identification information in the second data packet, the receiver determines one or more data blocks carried in the second data packet, and performs joint decoding on the first data block in the second data packet and a locally stored first data block. For example, STA2 receives an A-MPDU2 (the second data packet), and determines, according to the indication of the data block identification information carried in the A-MPDU2, that the A-MPDU2 carries a data block 1. Since there is a data block 1 locally cached, STA2 performs joint decoding on the data block 1 in the A-MPDU2 and the locally cached data block 1.

It can be seen that after receiving the first data packet, the receiver stores the data blocks in the first data packet, and records the lengths of the data blocks in the first data packet. Based on the correctly received data subframes, the data subframes which are not correctly received are stored, i.e. the data subframes to be retransmitted are stored; the lengths of the data subframes to be retransmitted are recorded; and the data subframes to be retransmitted are recorded as a first data block. In this way, after the second data packet is received, the data blocks carried in the second data packet are obtained and stored and then joint decoding can be performed. That is to say, the second data packet may include only the one or more data subframes to be retransmitted in the first data block, wherein the one or more data subframes to be retransmitted are data subframes that have not been correctly received in the previous transmission. The second data packet may also include a third data block, wherein the value of the bit corresponding to the third data block in the data block indication bitmap carried in the second data packet is set to a first preset value. If the second data packet includes the first data block, after receiving the first data block, the receiver performs joint decoding on the first data block and the first data block cached locally. For example, the SNs of the data subframes carried in the first data block of the first data packet are 1, 2, 3, 4 and 5, and when receiving the first data packet, the data subframes corresponding to 2, 4 and 5 in the first data block are correctly received, then the remaining data subframes that are not correctly received in the first data block may be grouped into a data block to be retransmitted, the data block number of the data block to be retransmitted is the same as the data block number of the first data block, and the content of the first data block may be updated and recorded as the data block to be retransmitted, the length of the data block is recorded as L1, and the first data block (data block to be retransmitted) is stored locally. After it is determined that the second data packet includes the first data block, the first data block carried in the second data packet is acquired according to the locally recorded length L1 of the first data block, and HARQ joint decoding is performed on the first data block acquired from the second data packet and the to-be-retransmitted data subframes of the first data block stored locally.

For example, when the A-MPDU is not an initial transmission frame transmitted by STA1 to STA2, the A-MPDU may include newly transmitted data block(s) or retransmitted data block(s), or include both the newly transmitted data block(s) and the retransmitted data block(s). One or more of the following operations are performed.

When the A-MPDU simultaneously includes the newly transmitted data block(s) and the retransmitted data block(s), the newly transmitted data block(s) and the retransmitted data block(s) are arranged according to a preset order.

When the A-MPDU includes a plurality of retransmitted data blocks, the retransmitted data blocks are sequentially arranged according to the order of the positions of the bits corresponding to the retransmission data blocks in the bitmap.

The data subframes in the retransmitted data block(s) in the A-MPDU are arranged in a certain order, for example, in an ascending order of SNs or CIDs.

STA1 groups, according to the reception status indication or acknowledgement indication, the one or more data subframes which are not correctly received in the current transmission into the same data block.

In an exemplary embodiment, the second data packet further includes at least one of: data block reception status information, wherein a value of the data block reception status information is used for indicating that the second data packet includes all data subframes of the one or more data blocks of the first data packet, or includes data subframes not correctly received in the one or more data blocks of the first data packet.

In some exemplary embodiments, the data block reception status information is an acknowledgement bit for indicating whether the sender receives the first acknowledgement frame.

In some exemplary embodiments, the data block reception status information is an acknowledgement bitmap, for example, when STA2 receives a first data packet, STA2 transmits a first acknowledgement frame to STA1, and when STA1 transmits a second data packet to STA2, STA1 sets a value of a corresponding bit in an acknowledgement indication bitmap carried in the second data packet to a second predetermined value for indicating that the first acknowledgement frame is received.

In some exemplary embodiments, the data block reception status information is a full data subframe indication or a partial data subframe indication for indicating that the second data packet includes all data subframes in the one or more data blocks of the first data packet, or includes data subframes not correctly received in the one or more data blocks of the first data packet.

In an exemplary embodiment, after receiving the second data packet, the receiver transmits a second acknowledgement frame to the sender, wherein the second acknowledgement frame is used for indicating one or more data subframes correctly received in the second data packet.

In an exemplary embodiment, the second data packet further includes a full data subframe indication or partial data subframe indication for indicating that the second data packet includes all data subframes of the first data block in the first data packet, or includes only data subframes that are not correctly received in the first data block of the first data packet.

In some exemplary implementations, the full data subframe indication or the partial data subframe indication may be a full/partial subframe indication or an full/partial codeword indication.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure provide a storage medium. The storage medium stores a computer program, wherein the computer program is configured to execute the operations in any one of the method embodiments at runtime.

In some exemplary implementations of the embodiments, the storage medium may be configured to store a computer program for executing each of the above operations.

In some exemplary implementations of the embodiments, the storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure provide an electronic device, including a memory and a processor, wherein the memory stores a computer program, and the processor is configured to run the computer program to execute the operations in any of the described method embodiments.

In some exemplary implementations, the electronic device may further include a transmission device and an input/output device, wherein the transmission device is connected to the processor, and the input/output device is connected to the processor.

In some exemplary implementations of the embodiments, the processor may be arranged to perform the above operations by a computer program.

For specific examples in the embodiments, reference may be made to the examples described in the foregoing embodiments and exemplary implementations, and details are not repeatedly described herein in the embodiments.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A data retransmission method performed by a sender, comprising:
   transmitting a first Aggregate Medium Access Control Protocol Data Unit (A-MPDU) to a receiver, wherein the first A-MPDU comprises multiple data blocks, each data block is composed of multiple A-MPDU subframes, and the first A-MPDU comprises data block identification information for identifying the multiple data blocks comprised in the first A-MPDU;
   receiving a reception status of the first A-MPDU from the receiver, wherein the reception status of the first A-MPDU is used for indicating one or more A-MPDU subframes not correctly received in the multiple data blocks of the first A-MPDU; and
   retransmitting, to the receiver based on the reception status of the first A-MPDU, the one or more A-MPDU subframes not correctly received by grouping the one or more A-MPDU subframes not correctly received into a first data block and transmitting the first data block to the receiver.

2. The method according to claim 1, wherein the data block identification information comprises at least one of:
   a data block indication bitmap, wherein each bit in the data block indication bitmap corresponds to one data block identifier, and a value of the bit is used for indicating whether the first A-MPDU carries a data block corresponding to the data block identifier;
   a data block identifier list, wherein each data block identifier in the data block identifier list is used for indicating a data block, which is carried in the first A-MPDU, corresponding to the data block identifier;
   an indication of a newly transmitted data block or an indication of a retransmitted data block, which is used for indicating whether the first A-MPDU carries a previously transmitted data block;
   a hybrid automatic repeat request identifier indication for indicating a data block, which is carried in the first A-MPDU, corresponding to a hybrid automatic repeat request identifier;
   a transmission identifier indication for indicating a data block, which is carried in the first A-MPDU, corresponding to a transmission identifier;
   an aggregate medium access control protocol data unit identifier indication for indicating a data block, which is carried in the first A-MPDU, corresponding to an aggregate medium access control protocol data unit identifier; and
   a physical layer protocol data unit identifier indication for indicating a data block, which is carried in the first A-MPDU, corresponding to an aggregate physical layer protocol data unit identifier.

3. The method according to claim 1, wherein retransmitting, to the receiver based on the reception status of the first A-MPDU, the one or more A-MPDU subframes not correctly received comprises at least one of:
   receiving a first acknowledgement frame corresponding to the first A-MPDU and transmitted by the receiver, and retransmitting, to the receiver, the one or more A-MPDU subframes which are not correctly received in the multiple data blocks of the first A-MPDU based on the first acknowledgement frame, wherein the first acknowledgement frame is used for indicating whether the receiver correctly receives A-MPDU subframes in the multiple data blocks of the first A-MPDU; and
   retransmitting, to the receiver, the first A-MPDU in a case where the first acknowledgement frame corresponding to the first A-MPDU is not received from the receiver within a predetermined time interval.

4. The method according to claim 1, wherein retransmitting, to the receiver based on the reception status of the first A-MPDU, the one or more A-MPDU subframes not correctly received comprises:
   setting data block identification information carried in a second A-MPDU to a first preset value, wherein the first preset value is used for indicating that the second A-MPDU comprises the first data block, and the first data block comprises one of: all A-MPDU subframes in a data block of the first A-MPDU, or the one or more A-MPDU subframes which are not correctly received in the multiple data blocks of the first A-MPDU; and
   transmitting the second A-MPDU.

5. The method according to claim 4, wherein the second A-MPDU further comprises data block reception status information, wherein the data block reception status information comprises at least one of:
   an acknowledgement bit, wherein a value of the acknowledgement bit is used for indicating whether a first acknowledgement frame is correctly received, and the first acknowledgement frame is used for indicating whether a receiver correctly receives A-MPDU subframes in the multiple data blocks of the first A-MPDU;
   an acknowledgement bitmap, wherein a value of each bit in the acknowledgement bitmap is used for indicating whether an acknowledgement frame, which corresponds to each bit, of the multiple data blocks is correctly received; and
   full A-MPDU subframe or partial A-MPDU subframe indication information, wherein the full A-MPDU subframe or partial A-MPDU subframe indication information is used for indicating that the second A-MPDU comprises all A-MPDU subframes of the multiple data blocks of the first A-MPDU, or the second A-MPDU comprises the one or more A-MPDU subframes not correctly received in the multiple data blocks of the first A-MPDU.

6. The method according to claim 1, further comprising one of:
   in a case where the first A-MPDU or a second A-MPDU comprises a plurality of data blocks, the plurality of data blocks are sequentially arranged according to a preset order;
   carrying the data block identification information or data block reception status information in a physical frame header of a data packet; or
   carrying the data block identification information or the data block reception status information in a hybrid automatic repeat request frame header.

7. A data retransmission method performed by a receiver, comprising:
   receiving a first Aggregate Medium Access Control Protocol Data Unit (A-MPDU) from a sender, wherein the first A-MPDU comprises multiple data blocks, each data block is composed of multiple A-MPDU subframes, and the first A-MPDU comprises data block identification information for identifying the multiple data blocks comprised in the first A-MPDU;
   transmitting a reception status of the first A-MPDU to the sender, wherein the reception status of the first A-MPDU is used for indicating one or more A-MPDU subframes not correctly received in the multiple data blocks of the first A-MPDU; and
   receiving the one or more A-MPDU subframes not correctly received and are retransmitted by the sender based on the reception status of the first A-MPDU, wherein the one or more A-MPDU subframes not correctly received are retransmitted by being grouped into a first data block which is transmitted to the receiver.

8. The method according to claim 7, further comprising:
determining, according to the data block identification information, the multiple data blocks carried in the first A-MPDU.

9. The method according to claim 8, wherein determining, according to the data block identification information, the multiple data blocks carried in the first A-MPDU comprises:
performing, reception joint decoding or independent decoding on the multiple data blocks;
wherein the reception joint decoding refers to combining the multiple data blocks with multiple corresponding data blocks stored locally, and decoding the combined data blocks; and the independent decoding refers to decoding the multiple data blocks.

10. The method according to claim 7, wherein after receiving the first A-MPDU, the method further comprises:
determining the multiple data blocks carried in the first A-MPDU based on the data block identification information, wherein multiple data blocks are acquired according to a preset order.

11. The method according to claim 7, wherein the data block identification information comprises at least one of:
a data block indication bitmap, wherein a value of each bit in the data block indication bitmap is used for determining a data block carried in the first A-MPDU;
a data block identifier list, wherein each data block identifier in the data block identifier list is used for determining a data block, which is carried in the first A-MPDU, corresponding to the data block identifier;
an indication of a newly transmitted data block or an indication of a retransmitted data block, which is used for determining multiple data blocks carried in the first A-MPDU;
a hybrid automatic repeat request identifier indication for determining a data block, which is carried in the first A-MPDU, corresponding to a hybrid automatic repeat request identifier;
a transmission identifier indication, which is used for determining a data block, which is carried in the first A-MPDU, corresponding to a transmission identifier;
an aggregate medium access control protocol data unit identifier indication for determining a data block, which is carried in the first A-MPDU, corresponding to an aggregate medium access control protocol data unit identifier; and
a physical layer protocol data unit identifier indication for determining a data block, which is carried in the first A-MPDU, corresponding to a physical layer protocol data unit identifier.

12. The method according to claim 10, wherein transmitting the reception status of the first A-MPDU comprises:
determining one or more correctly received A-MPDU subframes;
transmitting a first acknowledgement frame, wherein the first acknowledgement frame is used for indicating whether one or more A-MPDU subframes in the multiple data blocks of the first A-MPDU are correctly received.

13. The method according to claim 7, wherein receiving the first A-MPDU comprises at least one of:
storing the multiple data blocks of the first A-MPDU;
recording a length of a data block of the first A-MPDU;
recording a total length of one or more A-MPDU subframes that are not correctly received in the multiple data blocks of the first A-MPDU; and
storing the one or more A-MPDU subframes that are not correctly received in the multiple data blocks of the first A-MPDU.

14. The method according to claim 7, further comprising:
receiving a second A-MPDU;
based on data block identification information in the second A-MPDU, determining that the second A-MPDU comprises a first data block, wherein a value of the data block identification information is a first preset value, and the first preset value is used for indicating that the second A-MPDU comprises the first data block.

15. The method according to claim 14, further comprising:
determining, according to data block reception status information carried in the second A-MPDU, that the first data block carries all A-MPDU subframes of the multiple data blocks of the first A-MPDU, or determining that the first data block carries one or more A-MPDU subframes that are not correctly received in the multiple data blocks of the first A-MPDU;
or,
further comprising at least one of:
performing joint decoding on the first data block and a locally stored data block of the first A-MPDU, or on the first data block and one or more locally stored A-MPDU subframes which are not correctly received in the multiple data blocks of the first A-MPDU;
independently decoding the first data block;
independently decoding the first data block, and in a case where the independent decoding is incorrect, performing joint decoding on the first data block and a locally stored data block of the first A-MPDU, or performing joint decoding on the first data block and one or more locally stored A-MPDU subframes which are not correctly received in the multiple data blocks of the first A-MPDU.

16. The method according to claim 14, wherein after receiving the second A-MPDU, the method further comprises:
determining, based on a value of the data block identification information, that the second A-MPDU further comprises a second data block, wherein the value of the data block identification information is set to a second preset value for indicating that the second A-MPDU comprises the second data block;
or,
transmitting a second acknowledgement frame to a sender, wherein the second acknowledgement frame is used for indicating whether one or more A-MPDU subframes in multiple data blocks of the second A-MPDU are correctly received.

17. A data retransmission device, comprising a memory and a processor, wherein the memory stores a computer program, and the processor is configured to run the computer program to execute the method according to claim 7.

18. A data retransmission device, comprising a memory and a processor, wherein the memory stores a computer program, and the processor is configured to run the computer program to:
transmit a first Aggregate Medium Access Control Protocol Data Unit (A-MPDU) to a receiver, wherein the first A-MPDU comprises multiple data blocks, each data block is composed of multiple A-MPDU subframes, and the first A-MPDU comprises data block identification information for identifying the multiple data blocks comprised in the first A-MPDU;

receive a reception status of the first A-MPDU from the receiver, wherein the reception status of the first A-MPDU is used for indicating one or more A-MPDU subframes not correctly received in the multiple data blocks of the first A-MPDU; and retransmit, to the receiver based on the reception status of the first A-MPDU, the one or more A-MPDU subframes not correctly received by grouping the one or more A-MPDU subframes not correctly received into a first data block and transmitting the first data block to the receiver.

\* \* \* \* \*